US008649569B2

(12) United States Patent
Shindo et al.

(10) Patent No.: US 8,649,569 B2
(45) Date of Patent: Feb. 11, 2014

(54) AUTHENTICATION APPARATUS, IMAGE CAPTURE APPARATUS, AUTHENTICATION METHOD, AND AUTHENTICATION PROGRAM

(75) Inventors: Tatsuo Shindo, Maebashi (JP); Tatsuo Kamimura, Maebashi (JP); Naoko Suzuki, Inagi (JP); Kazuya Ogawa, Maebashi (JP); Shinichi Eguchi, Inagi (JP); Michitaro Manabe, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 107 days.

(21) Appl. No.: 13/186,048

(22) Filed: Jul. 19, 2011

(65) Prior Publication Data
US 2011/0274318 A1 Nov. 10, 2011

Related U.S. Application Data

(63) Continuation of application No. PCT/JP2009/051541, filed on Jan. 30, 2009.

(51) Int. Cl.
*G06K 9/00* (2006.01)

(52) U.S. Cl.
USPC .......................................... 382/115

(58) Field of Classification Search
None
See application file for complete search history.

(56) References Cited

U.S. PATENT DOCUMENTS

| 5,852,670 | A  | * | 12/1998 | Setlak et al. ............... 382/126 |
| 7,260,246 | B2 | * | 8/2007  | Fujii ............................ 382/124 |
| 7,729,518 | B2 | * | 6/2010  | Awatsu et al. ............. 382/115 |
| 8,000,503 | B2 | * | 8/2011  | Kamata et al. ............. 382/115 |
| 8,184,866 | B2 | * | 5/2012  | Takaku et al. ............. 382/115 |
| 8,190,239 | B2 | * | 5/2012  | Endoh et al. .............. 600/473 |
| 2008/0107309 | A1 | * | 5/2008 | Cerni ......................... 382/115 |
| 2008/0226136 | A1 | * | 9/2008 | Takaku et al. ............. 382/115 |

FOREIGN PATENT DOCUMENTS

| EP | 1903509 A1 | 3/2008 |
| JP | 2002-10980 A | 1/2002 |
| JP | 2002-010980 A | 1/2002 |
| JP | 2006-102360 A | 4/2006 |
| JP | 2007-229360 A | 9/2007 |

(Continued)

OTHER PUBLICATIONS

Korean Office Action dated Oct. 11, 2012, issued in corresponding Korean patent application No. 10-2011-7016985, w/ partial English translation.

(Continued)

*Primary Examiner* — Samir Ahmed
(74) *Attorney, Agent, or Firm* — Westerman, Hattori, Daniels & Adrian, LLP

(57) ABSTRACT

In an authentication apparatus, an input section acquires a living body image which an image capture apparatus generates by capturing an image of a living body that is an object of authentication, and outputs the living body image to an operation section. When the operation section acquires the living body image from the input section, the operation section calculates, on the basis of the living body image acquired and a registered image stored in a registered image storage section, the difference between the relative position of the living body with respect to the image capture apparatus at the time of acquiring the living body image and the relative position of the living body with respect to the image capture apparatus at the time of acquiring the registered image. The output section outputs guidance information for prompting a reduction in the difference in the relative position calculated by the operation section.

13 Claims, 16 Drawing Sheets

(56) References Cited

FOREIGN PATENT DOCUMENTS

| | | |
|---|---|---|
| JP | 2007-233231 A | 9/2007 |
| JP | 2007-233981 A | 9/2007 |
| JP | 2007-330701 A | 12/2007 |
| JP | 2008-071158 A | 3/2008 |
| JP | 2008-134862 A | 6/2008 |
| JP | 2008-253598 A | 10/2008 |

OTHER PUBLICATIONS

Japanese Office Action dated Nov. 20, 2012, issued in corresponding Japanese patent application No. 2010-548322, w/ partial English translation.

Japanese Office Action dated Apr. 10, 2012, issued in corresponding Japanese Patent Application No. 2010-548322.

International Search Report of PCT/JP2009/051541, date of mailing Apr. 28, 2009.

* cited by examiner

AUTHENTICATION APPARATUS, IMAGE CAPTURE APPARATUS, AUTHENTICATION METHOD, AND AUTHENTICATION PROGRAM

This application is a continuing application, filed under 35 U.S.C. §111(a), of International Application PCT/JP2009/051541, filed on Jan. 30, 2009.

FIELD

The embodiments discussed herein are related to an authentication apparatus, an image capture apparatus, an authentication method, and an authentication program.

BACKGROUND

At present an individual can be specified by biometrics authentication in which a living body is an object of authentication. For example, authentication by palm or finger veins (vein authentication) is easy to use, so it has spread in places which ordinary people use as an authentication method which provides great security.

With the vein authentication near-infrared light is used for capturing an image of the pattern of palm or finger veins and a vein pattern acquired by the image capture is compared with a vein pattern registered in advance. If the vein pattern at registration time matches the vein pattern acquired by the image capture at authentication time with determined accuracy, then an identity is confirmed (see, for example, Japanese Laid-open Patent Publication No. 2007-229360 and Japanese Laid-open Patent Publication No. 2007-233231).

When an image of a vein pattern is captured, it is necessary to place a palm or a finger at a determined position with respect to an image capture apparatus. Accordingly, a position at which a palm or a finger is placed at registration time may differ from a position at which the palm or the finger is placed at authentication time. In this case, an image of the vein pattern captured at registration time differs from an image of the vein pattern captured at authentication time. As a result, in spite of the vein pattern of the same person, the erroneous determination that an image of a vein pattern of another person is captured at authentication time may be made.

In order to avoid such an authentication failure, a method for making a positional correction of a vein pattern acquired by image capture at authentication time before comparison is proposed. For example, a method for acquiring vein characteristic information by capturing an image of a vein pattern at authentication time, making a positional correction of the vein characteristic information by the use of characteristic information for wrinkles in a finger acquired by image capture through the use of visible light, and making a comparison by the use of the vein characteristic information after the correction is known (see, for example, Japanese Laid-open Patent Publication No. 2008-134862).

It is assumed that, like the method disclosed in the above Japanese Laid-open Patent Publication No. 2008-134862, corrected information is used for making a comparison. However, if the amount of vein characteristic information acquired is smaller than that of registered information, the reliability of authentication itself cannot be improved. That is to say, in order to improve the reliability of authentication itself, it is necessary to perform authentication by making vein patterns acquired by image capture at registration time and authentication time match with great accuracy. Accordingly, it is necessary to increase reproducibility so that the position of a living body with respect to an image capture apparatus at authentication time will match the position of the living body with respect to the image capture apparatus at registration time as closely as possible.

SUMMARY

According to an aspect of the invention, an authentication apparatus for performing biometrics authentication including: an operation section which calculates, at the time of acquiring a living body image which an image capture apparatus generates by capturing an image of a living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and an output section which outputs guidance information for prompting a reduction in the difference in the relative position calculated by the operation section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will now be described in detail with reference to the accompanying drawings.

Figure 1:
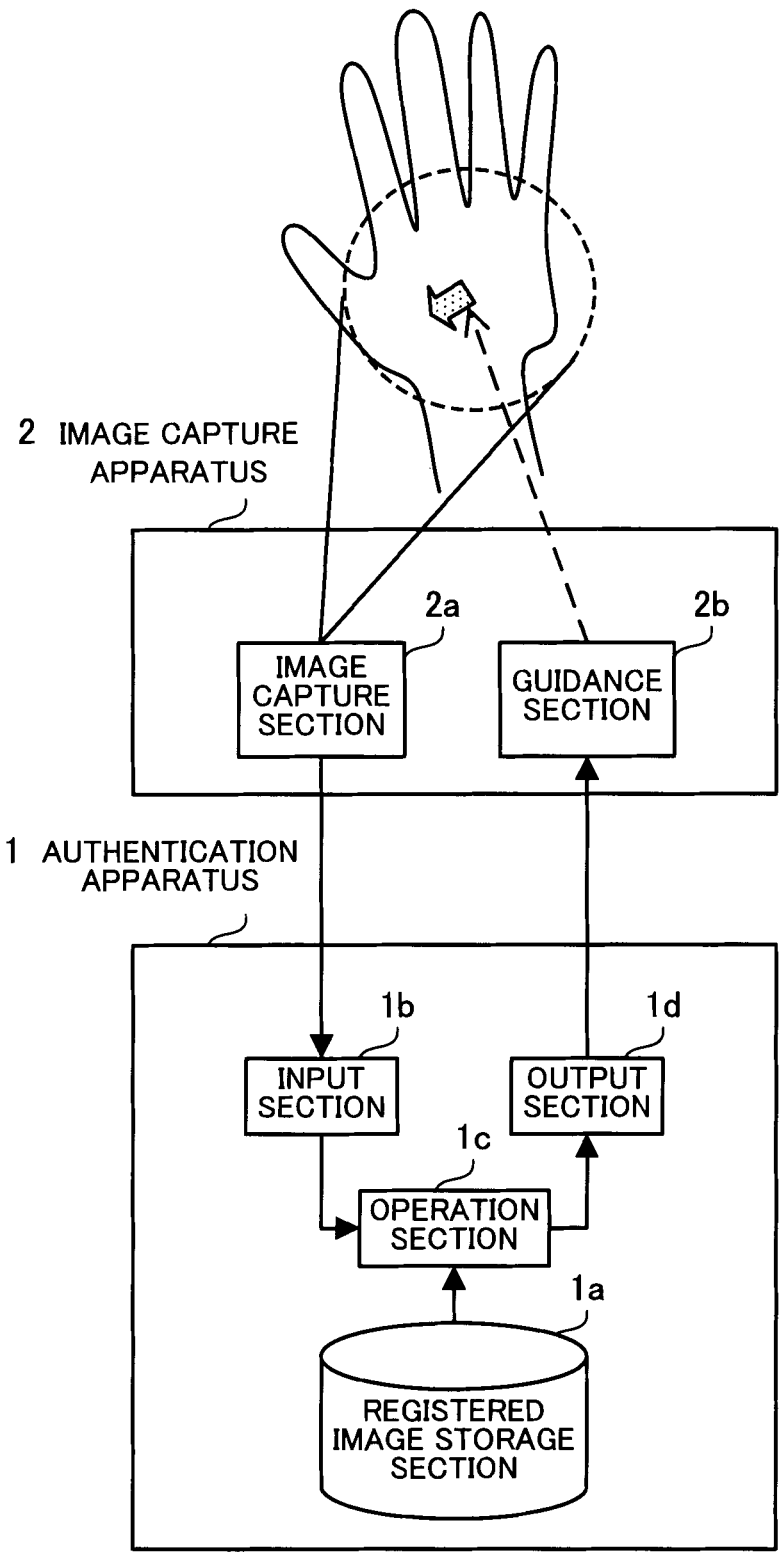
FIG. 1 is a view for giving an overview of an authentication apparatus.

FIG. 1 is a view for giving an overview of an authentication apparatus. An authentication apparatus 1 is connected to an image capture apparatus 2. The authentication apparatus 1 performs identity confirmation on the basis of a living body image which the image capture apparatus 2 generates by capturing an image of a living body (palm veins, for example). The authentication apparatus 1 includes a registered image storage section 1a, an input section 1b, an operation section 1c, and an output section 1d.

The registered image storage section 1a stores a registered image of a living body. The registered image is registered in advance by a user. For example, the registered image is an image of the vein pattern of the user's palm.

The input section 1b acquires a living body image generated by an image capture section 2a of the image capture apparatus 2. The input section 1b outputs the living body image acquired to the operation section 1c.

When the operation section 1c acquires the living body image from the input section 1b, the operation section 1c calculates, on the basis of the living body image and the registered image stored in the registered image storage section 1a, the difference between the relative position of the living body with respect to the image capture apparatus 2 at the time of acquiring the living body image and the relative position of the living body with respect to the image capture apparatus 2 at the time of acquiring the registered image. Information indicative of the difference in the relative position is, for example, information indicative of the amount of movement in the direction of each axis in three-axis translation or the angle of a rotation on each axis in three-axis rotation in a determined three-dimensional coordinate system.

The output section 1d outputs guidance information for prompting a reduction in the difference in the relative position calculated by the operation section 1c. The output section 1d outputs the guidance information to a guidance section 2b of the image capture apparatus 2.

The image capture apparatus 2 includes the image capture section 2a and the guidance section 2b.

The image capture section 2a captures an image of the living body, generates the living body image, and outputs it to the input section 1b.

The guidance section 2b acquires the guidance information which the output section 1d outputs according to the living body image outputted by the image capture section 2a. On the basis of the guidance information acquired, the guidance section 2b then informs the user of the contents of a change in the relative position of the living body with respect to the image capture apparatus 2. The guidance section 2b may inform the user of the contents of a change in the relative position by, for example, projecting an image of determined shape (arrow, for example) indicative of the direction in which the image capture apparatus 2 or the living body should be moved on the living body, with voice, by displaying a figure or a character string indicative of the contents of a change in the relative position on a display device (not illustrated), or the like.

According to the above authentication apparatus 1, the operation section 1c acquires a living body image which the image capture apparatus 2 generates by capturing an image of the living body. At this time the operation section 1c calculates, on the basis of the living body image and a registered image stored in the registered image storage section 1a, the difference between the relative position of the living body with respect to the image capture apparatus 2 at the time of acquiring the living body image and the relative position of the living body with respect to the image capture apparatus 2 at the time of acquiring the registered image. The output section 1d outputs guidance information for prompting a reduction in the difference in the relative position calculated by the operation section 1c.

As a result, the reproducibility of the position of a living body with respect to the image capture apparatus 2 at authentication time can be increased. To be concrete, on the basis of guidance information outputted by the authentication apparatus 1, the guidance section 2b informs the user of the contents of a change in the relative position of the living body with respect to the image capture apparatus 2 so that the relative position of the living body with respect to the image capture apparatus 2 at authentication time will become close to the relative position of the living body with respect to the image capture apparatus 2 at registered image capture time. In accordance with the contents of the change of which the user is informed, the user change the position of the image capture apparatus 2 or the living body. By doing so, the placement of the living body and the image capture apparatus 2 at the authentication time can be made close to the placement of the living body and the image capture apparatus 2 at registration time. That is to say, the reproducibility of the placement of the living body and the image capture apparatus 2 at the authentication time is increased. Therefore, identity confirmation can be performed by making vein patterns acquired by image capture at the registration time and the authentication time match with great accuracy, and authentication accuracy can be improved.

The guidance section 2b is included in the image capture apparatus 2. However, another structure may be adopted. For example, the guidance section 2b may be included in the authentication apparatus 1.

By the way, the authentication apparatus 1 can be applied to, for example, identity confirmation by a portable telephone. A more detailed description will now be given with the case where the authentication apparatus 1 is applied to a portable telephone as an example. The authentication apparatus 1 can be applied not only to portable telephones but also to other portable information terminals such as PDAs (Personal Digital Assistants). In addition, the authentication apparatus 1 can be applied to ATMs (Automated Teller Machines) in financial institutions for user authentication, personal computers for log-in authentication, and the like.

Figure 2:
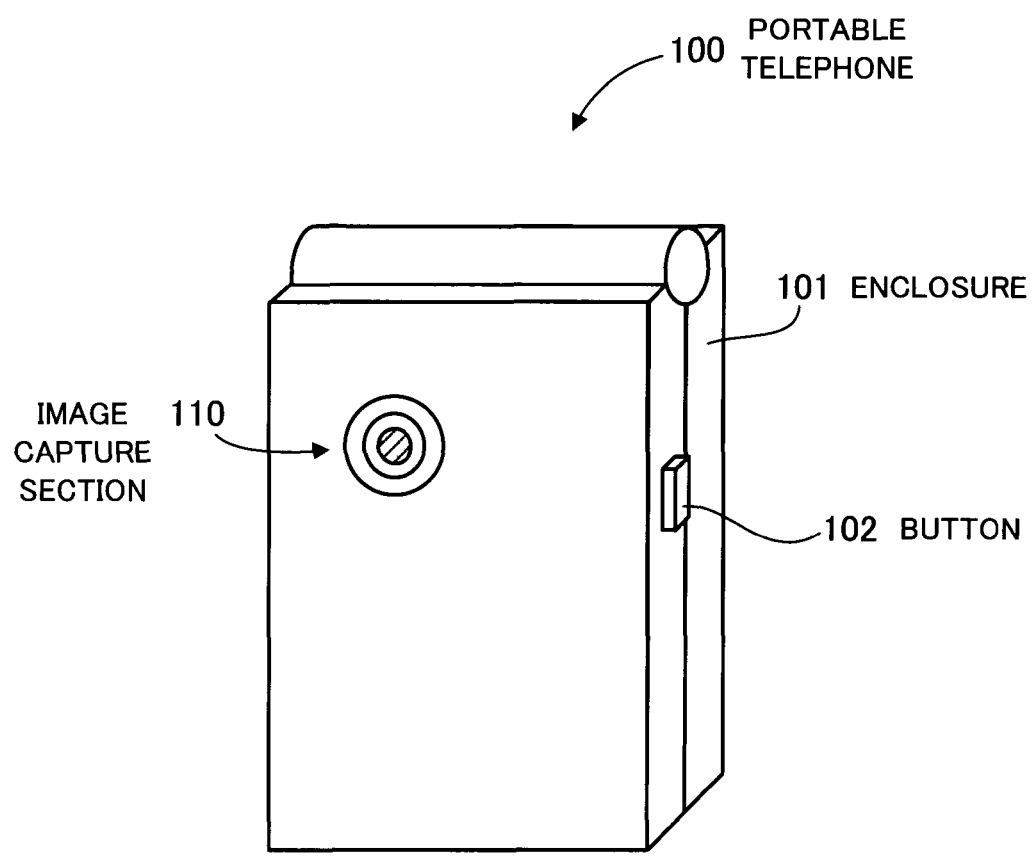
FIG. 2 illustrates the appearance of a portable telephone.

FIG. 2 illustrates the appearance of a portable telephone. A portable telephone 100 has a biometrics authentication function for identity confirmation. Confirmation of identity can be used for determining whether a person can use the portable telephone 100 or not, whether the person can read a telephone directory or electronic mail, whether the person can use various applications, and the like. The portable telephone 100 has an enclosure 101. FIG. 2 illustrates a state in which the folding portable telephone 100 is folded.

The enclosure 101 is an enclosure of the portable telephone 100 and includes a button 102 for accepting operation input to begin identity confirmation. By pressing down the button 102, a user can give the portable telephone 100 instructions to begin identity confirmation. The enclosure 101 also includes an image capture section 110.

The image capture section 110 captures an image of the vein pattern of the user's palm at identity confirmation time. The image capture section 110 includes a light source for irradiating the palm with near-infrared light to capture an image of the vein pattern. In addition, the image capture section 110 includes a light source for emitting guidance light to prompt the user at image capture time to change the position of the portable telephone 100 with respect to the palm. The details of the structure of the image capture section 110 will be described later.

Figure 3:
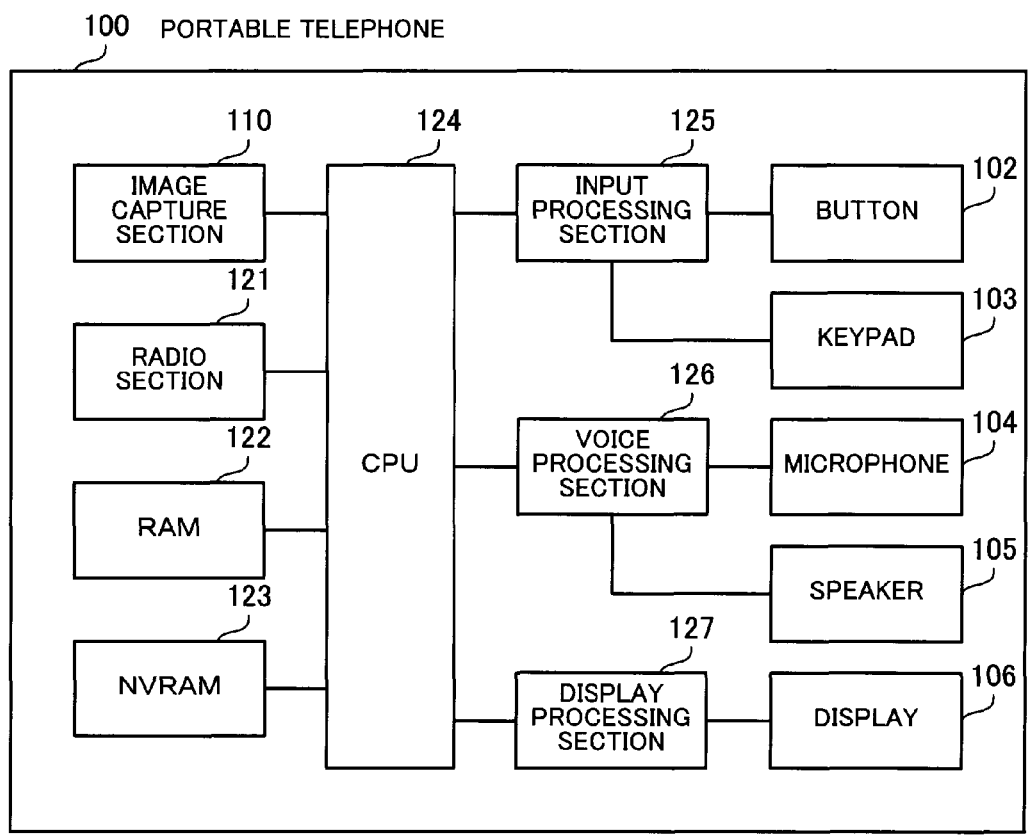
FIG. 3 illustrates the hardware structure of the portable telephone.

FIG. 3 illustrates the hardware structure of the portable telephone. The portable telephone 100 includes the button 102, a keypad 103, a microphone 104, a speaker 105, a display 106, the image capture section 110, a radio section 121, a RAM (Random Access Memory) 122, a NVRAM (NonVolatile RAM) 123, a CPU (Central Processing Unit) 124, an input processing section 125, a voice processing section 126, and a display processing section 127.

The button 102 is described above in FIG. 2.

The keypad 103 includes various keys such as a ten key and function keys. When a key is pressed down, the keypad 103 detects that the key is pressed down, and converts the pressing down of the key to an electrical signal. By performing the operation of pressing down a key, the user can make a telephone call, answer the telephone, input various character strings including telephone numbers, input instructions to begin authentication, or the like.

The microphone 104 accepts sound input by converting physical vibration of sound to an electrical signal. For example, while the user of the portable telephone 100 is speaking over the telephone, the user's voice or background noise at the user end is inputted from the microphone 104.

The speaker 105 reproduces sound by converting an electrical signal to physical vibration. For example, while the user of the portable telephone 100 is speaking over the telephone, the voice of the person at the other end of the line or background noise at the other end of the line is outputted from the speaker 105.

The display 106 displays various images. A LCD (Liquid Crystal Display), an organic EL (ElectroLuminescence) display, or the like can be used as the display 106.

The image capture section 110 is described above in FIG. 2.

The radio section 121 processes a radio signal and realizes radio communication with another communication apparatus such as a base station. To be concrete, the radio section 121 demodulates and decodes a signal received via an antenna installed on the portable telephone 100, and outputs received data obtained to the CPU 124. In addition, the radio section 121 codes and modulates transmitted data acquired from the CPU 124, and outputs a transmitted signal obtained via the antenna.

The RAM 122 temporarily stores a program executed by the CPU 124 or data used by the CPU 124 for performing a process. The CPU 124 temporarily stores at least part of various programs or various pieces of data in the RAM 122. In addition, the CPU 124 properly updates data stored in the RAM 122. Another kind of volatile memory may be used in place of the RAM 122.

The NVRAM 123 stores a program executed by the CPU 124 or data used by the CPU 124 for performing a process. Various programs for realizing a communication function and a display control function are stored in advance in the NVRAM 123. In addition, various pieces of data used with these programs are stored in the NVRAM 123.

The CPU 124 controls the operation of the entire portable telephone 100. To be concrete, at the time of starting the portable telephone 100 and at need after starting the portable telephone 100, the CPU 124 reads out a program or data from the NVRAM 123 and executes the program by the use of the RAM 122. On the basis of received data acquired from the radio section 121, voice data acquired from the voice processing section 126, or an input signal acquired from the input processing section 125, for example, the CPU 124 performs various processes. The CPU 124 then generates transmitted data to be outputted to the radio section 121, voice data to be outputted to the voice processing section 126, image data to be outputted to the display processing section 127, or the like as a processing result.

The input processing section 125 handles input operation by the user. To be concrete, when the button 102 or a key on the keypad 103 is pressed down, the input processing section 125 outputs an input signal indicative of the button 102 or the key pressed down to the CPU 124.

The voice processing section 126 processes a voice signal. To be concrete, the voice processing section 126 acquires an analog voice signal from the microphone 104, performs a necessary signal conversion process, and outputs voice data to the CPU 124. In addition, the voice processing section 126 acquires voice data from the CPU 124, performs a necessary signal conversion process, and makes the speaker 105 reproduce voice.

The display processing section 127 performs an image display process. To be concrete, the display processing section 127 acquires image data from the CPU 124 and makes the display 106 display it. An image displayed on the display 106 is a menu, content such as a document, a static image, or a dynamic image, or the like.

Figure 4A:
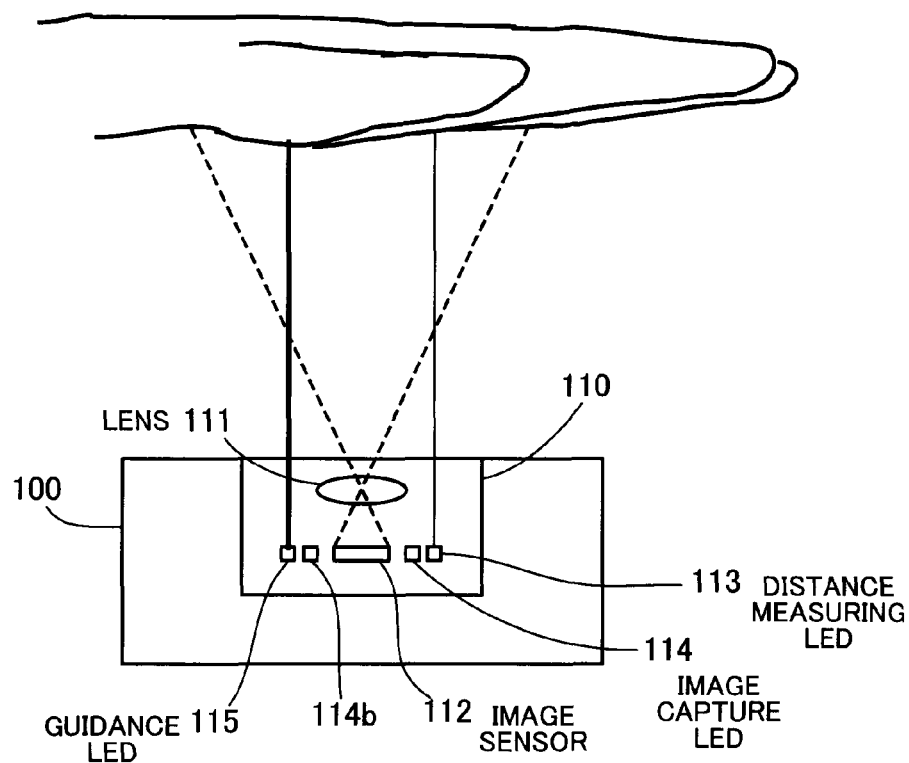
FIGS. 4A and 4B illustrate the hardware structure of an image capture section.
Figure 4B:
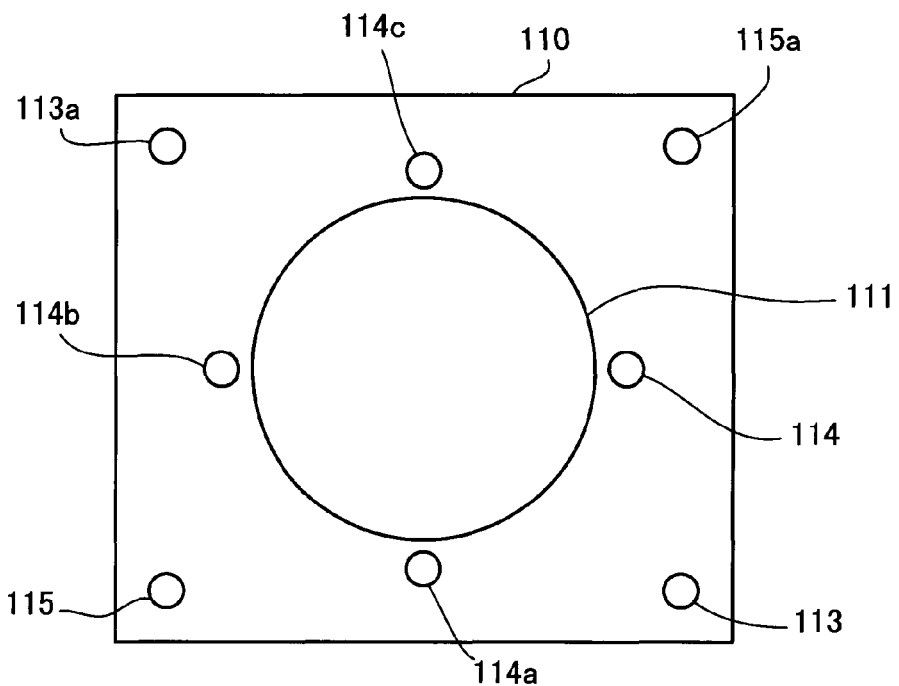

FIGS. 4A and 4B illustrate the hardware structure of the image capture section. FIG. 4A is a side view of the image capture section 110 and FIG. 4B is a top view of the image capture section 110. In FIG. 4B, however, the portable telephone 100 is not illustrated. The image capture section 110 includes a lens 111, an image sensor 112, distance measuring LEDs (Light Emitting Diodes) 113 and 113a, image capture LEDs 114, 114a, 114b, and 114c, and guidance LEDs 115 and 115a.

The lens 111 is used for guiding near-infrared light reflected from a palm onto a light-receiving surface of the image sensor 112. The lens 111 is placed so that when an image of a palm is captured at a determined distance, near-infrared light reflected from a determined image capture area of the palm will be projected on the light-receiving surface of the image sensor 112.

The image sensor 112 is a two-dimensional image sensor made up of light receiving elements arranged two-dimensionally. A CMOS (Complementary Metal Oxide Semiconductor) image sensor, a CCD (Charge-Coupled Device) image sensor, or the like can be used as the image sensor 112.

The distance measuring LEDs 113 and 113a are light sources of a distance measuring light beam (near-infrared light) for measuring the distance between an object of image capture (palm, in this example) and the image capture section 110.

A method disclosed in Japanese Laid-open Patent Publication No. 2007-233231 can be used as a distance measuring method using the distance measuring LEDs 113 and 113a. To be concrete, when the image capture section 110 measures the distance, the image capture section 110 makes the distance measuring LED 113 light and irradiates the palm with a distance measuring light beam. At this time the palm is not irradiated with light emitted by the image capture LEDs 114, 114a, 114b, and 114c. Accordingly, the image sensor 112 detects a spot of light reflected from the palm. With an increase in the distance between the palm and the image capture section 110, the position of the spot gets closer to the center of an image captured. With a decrease in the distance between the palm and the image capture section 110, the position of the spot gets farther from the center of an image captured. That is to say, by calculating the distance between the center of an image captured by irradiating the palm with a distance measuring light beam and the position of the spot of light reflected from the palm, the distance between the palm and the image capture section 110 can be measured. The portable telephone 100 can exercise control such as capturing an image of the vein pattern at the timing when distance measured by this method becomes proper. The distance measuring LEDs 113 and 113a are placed, for example, diagonally around the lens 111. By using both of the distance measuring LEDs 113 and 113a, the accuracy of measuring the distance can be improved. However, one distance measuring LED or three or more distance measuring LEDs may be placed.

The image capture LEDs 114, 114a, 114b, and 114c are light sources for irradiating the palm with near-infrared light. Near-infrared light emitted by the image capture LEDs 114, 114a, 114b, and 114c is guided toward the palm by a light guide (not illustrated) and is diffused so that the palm will be irradiated uniformly with it. The image capture LEDs 114, 114a, 114b, and 114c are placed, for example, around the lens 111 so that each of four parts into which a determined image capture area of the palm is divided can be irradiated with near-infrared light of uniform intensity.

The guidance LEDs 115 and 115a are light sources of visible light which project indicator images on the palm for the user to guide the position of the palm with respect to the image capture section 110. The indicator images are arrows indicative of directions in which the portable telephone 100 should be moved, spot images indicative of the center of a current image capture area and the center of an image capture area at registration time, or the like. The guidance LEDs 115 and 115a are placed, for example, diagonally around the lens 111.

The structure of an image capture apparatus disclosed in Japanese Laid-open Patent Publication No. 2007-229360 or Japanese Laid-open Patent Publication No. 2007-233231 can be applied to the structure of the lens 111, the image sensor 112, the distance measuring LEDs 113 and 113a, or the image capture LEDs 114, 114a, 114b, and 114c included in the image capture section 110.

Figure 5:
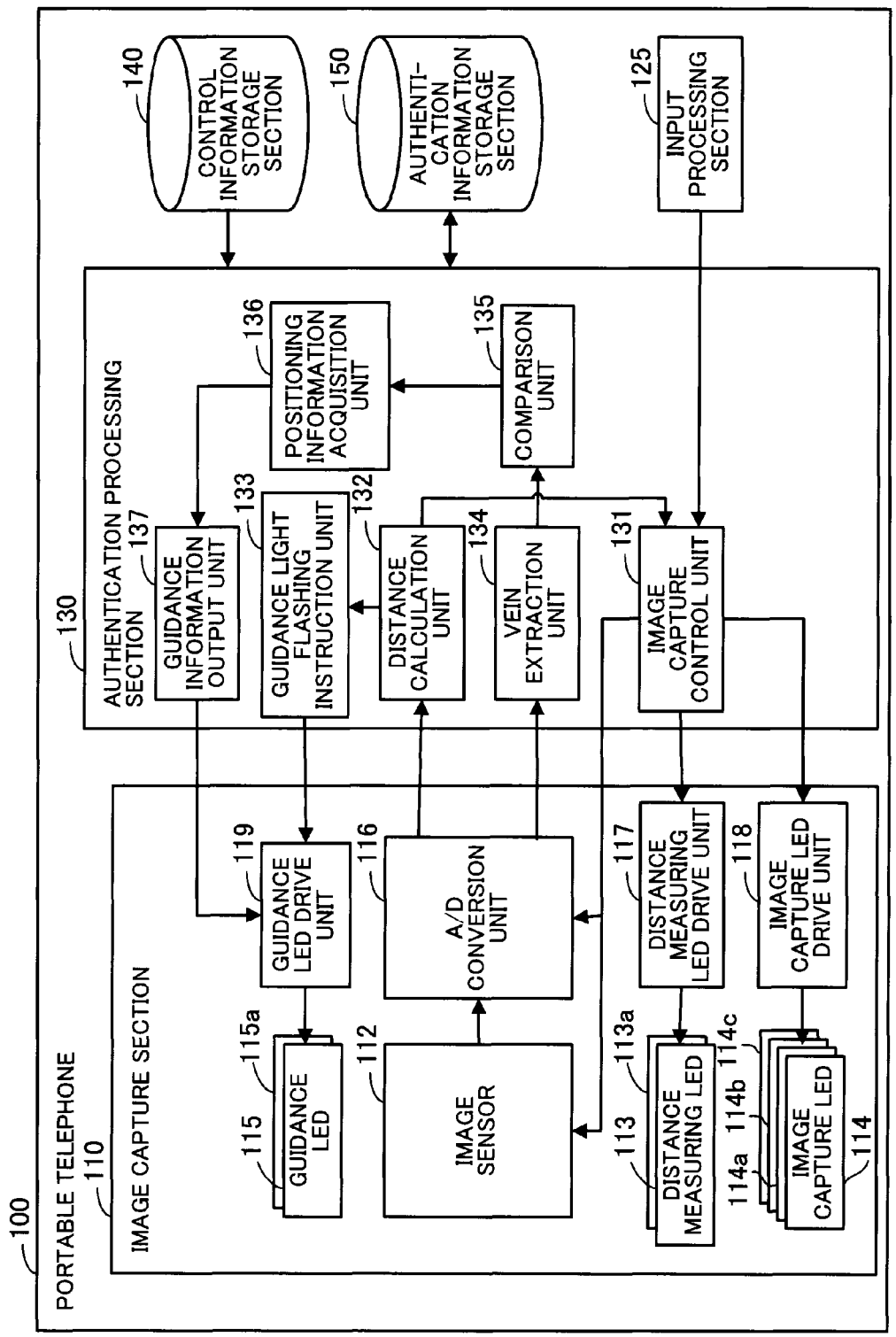
FIG. 5 illustrates the functional structure of the portable telephone.

FIG. 5 illustrates the functional structure of the portable telephone. The portable telephone 100 includes the image capture section 110, the input processing section 125, an authentication processing section 130, a control information storage section 140, and an authentication information storage section 150. The input processing section 125 is described above in FIG. 3.

The image capture section 110 includes the image sensor 112, the distance measuring LEDs 113 and 113a, the image capture LEDs 114, 114a, 114b, and 114c, the guidance LEDs 115 and 115a, an A/D (Analog-to-Digital) conversion unit 116, a distance measuring LED drive unit 117, an image capture LED drive unit 118, and a guidance LED drive unit 119. The image sensor 112, the distance measuring LEDs 113 and 113a, the image capture LEDs 114, 114a, 114b, and 114c, and the guidance LEDs 115 and 115a are described above in FIGS. 4A and 4B.

The A/D conversion unit 116 converts analog output from each of the light receiving elements which make up the image sensor 112 to a digital value, and generates a distance measuring image or a vein image. The A/D conversion unit 116 outputs the generated distance measuring image to a distance calculation unit 132. In addition, the A/D conversion unit 116 outputs the generated vein image to a vein extraction unit 134.

The distance measuring LED drive unit 117 turns on or off the distance measuring LEDs 113 and 113a.

The image capture LED drive unit 118 turns on or off the image capture LEDs 114, 114a, 114b, and 114c.

The guidance LED drive unit 119 turns on or off the guidance LEDs 115 and 115a. In addition, the guidance LED drive unit 119 controls the flashing operation of the guidance LEDs 115 and 115a. Furthermore, the guidance LED drive unit 119 changes indicator images which the guidance LEDs 115 and 115a project on the palm. Moreover, the guidance LED drive unit 119 changes the positions of the guidance LEDs 115 and 115a to change positions at which the indicator images are projected.

The authentication processing section 130 includes an image capture control unit 131, the distance calculation unit 132, a guidance light flashing instruction unit 133, a vein extraction unit 134, a comparison unit 135, a positioning information acquisition unit 136, and a guidance information output unit 137. The functions of the authentication processing section 130 are realized when the CPU 124 executes determined programs. However, part or all of these functions may be realized by dedicated hardware.

The image capture control unit 131 controls capture of an image of the palm by the image capture section 110. To be concrete, the image capture control unit 131 performs the following process.

(1) When the user provides input by operating the button 102 or the keypad 103, the image capture control unit 131 acquires image capture instructions from the input processing section 125. The image capture control unit 131 then gives the distance measuring LED drive unit 117 instructions to turn on the distance measuring LED 113. In addition, the image capture control unit 131 gives the image sensor 112 and the A/D conversion unit 116 instructions to capture an image of the palm and generate a distance measuring image respectively.

(2) The image capture control unit 131 acquires the distance between the palm and the image capture section 110 calculated by the distance calculation unit 132. If this distance is suitable for capturing an image of the vein pattern, then the image capture control unit 131 gives the image capture LED drive unit 118 instructions to turn on the image capture LEDs. In addition, the image capture control unit 131 gives the image sensor 112 and the A/D conversion unit 116 instructions to capture an image of the palm and generate a vein image respectively. If the distance acquired from the distance calculation unit 132 is not suitable for capturing an image of the vein pattern, then the image capture control unit 131 performs the process (1) again.

On the basis of the distance measuring image generated by the A/D conversion unit 116, the distance calculation unit 132 calculates the distance between the palm and the image capture section 110. The distance calculation unit 132 outputs the distance calculated to the guidance light flashing instruction unit 133 and the image capture control unit 131.

When the guidance light flashing instruction unit 133 acquires the distance calculated by the distance calculation unit 132, the guidance light flashing instruction unit 133 gives the guidance LED drive unit 119 instructions to make the guidance LED 115 flash in a cycle corresponding to the distance. At this time the guidance LED drive unit 119 makes only the guidance LED 115 flash. It is safe to keep the guidance LED 115a turned off. An indicator image which the guidance LED 115 projects is a mere spot image obtained by a light beam. By visually checking, for example, the cycle of the flashing of the spot image, the user can judge whether to bring the palm close to the image capture section 110 or to bring the palm far from the image capture section 110. Information regarding a flashing cycle corresponding to distance is set in advance in the control information storage section 140 as operation control information for the guidance LEDs 115 and 115a. The guidance light flashing instruction unit 133 refers to this operation control information and specifies a flashing cycle corresponding to distance.

The vein extraction unit 134 performs an edge enhancement process on the vein image generated by the A/D conversion unit 116, and extracts a vein pattern. The vein extraction unit 134 outputs the vein pattern extracted to the comparison unit 135.

The comparison unit 135 compares the vein pattern acquired from the vein extraction unit 134 with a vein pattern stored in the authentication information storage section 150. The vein pattern of the user is registered in advance in the authentication information storage section 150. The comparison unit 135 calculates similarity parameter between the vein patterns by the comparison and determines on the basis of the similarity parameter whether or not the vein pattern acquired by image capture is the vein pattern of the user. Similarity parameter is calculated as a parameter. For example, the similarity parameter "0" indicates that the vein patterns match completely. As similarity parameter becomes larger, the degree of dissimilarity becomes higher. If the similarity parameter is greater than or equal to 0 and is smaller than P1, then the comparison unit 135 determines that the vein pattern acquired by the image capture is the vein pattern of the user. In this case, a comparison result is "Yes." If the similarity parameter is greater than P2 (P2>P1), then the comparison unit 135 determines that the vein pattern acquired by image capture is the vein pattern of a person other than the user. In this case, a comparison result is "No." If the similarity parameter is greater than or equal to P1 and is smaller than or equal to P2, the comparison unit 135 cannot determine whether or not the vein pattern acquired by the image capture is the vein pattern of the user. Accordingly, the comparison unit 135 determines that reauthentication is necessary.

If the comparison unit 135 determines that reauthentication is necessary, then the positioning information acquisition unit 136 specifies the difference (hereinafter referred to as the relative position difference) between the relative position of the palm with respect to the image capture section 110 at the time of the current image capture and the relative position of the palm with respect to the image capture section 110 at the time of image capture for registering the vein pattern in the authentication information storage section 150. On the basis of the relative position difference specified, the positioning information acquisition unit 136 acquires positioning information indicative of how the position of the image capture section 110 with respect to the palm should be changed in order to reproduce the position of the image capture section 110 with respect to the palm at the registration time. The positioning information acquisition unit 136 can acquire such positioning information on the basis of the similarity parameter calculated by the comparison unit 135. The details of a concrete method for calculating the similarity parameter will be described later. The positioning information acquisition unit 136 outputs the positioning information acquired to the guidance information output unit 137.

On the basis of the positioning information acquired from the positioning information acquisition unit 136, the guidance information output unit 137 generates guidance information indicative of the contents (arrow, for example) of an indicator image which the guidance LED 115 or 115a projects and the position at which the indicator image is projected. The guidance information output unit 137 outputs the guidance information generated to the guidance LED drive unit 119.

The control information storage section 140 stores information for controlling the flashing operation of the guidance LED 115 and information regarding a threshold of similarity parameter for performing identity confirmation at authentication time. These pieces of information are stored in advance in the control information storage section 140.

The authentication information storage section 150 stores a vein pattern used for comparison at user authentication time. This vein pattern is stored in advance in the authentication information storage section 150. For example, if vein patterns of a plurality of users are stored, the vein patterns are associated with identification information given to the plurality of users.

Figure 6:
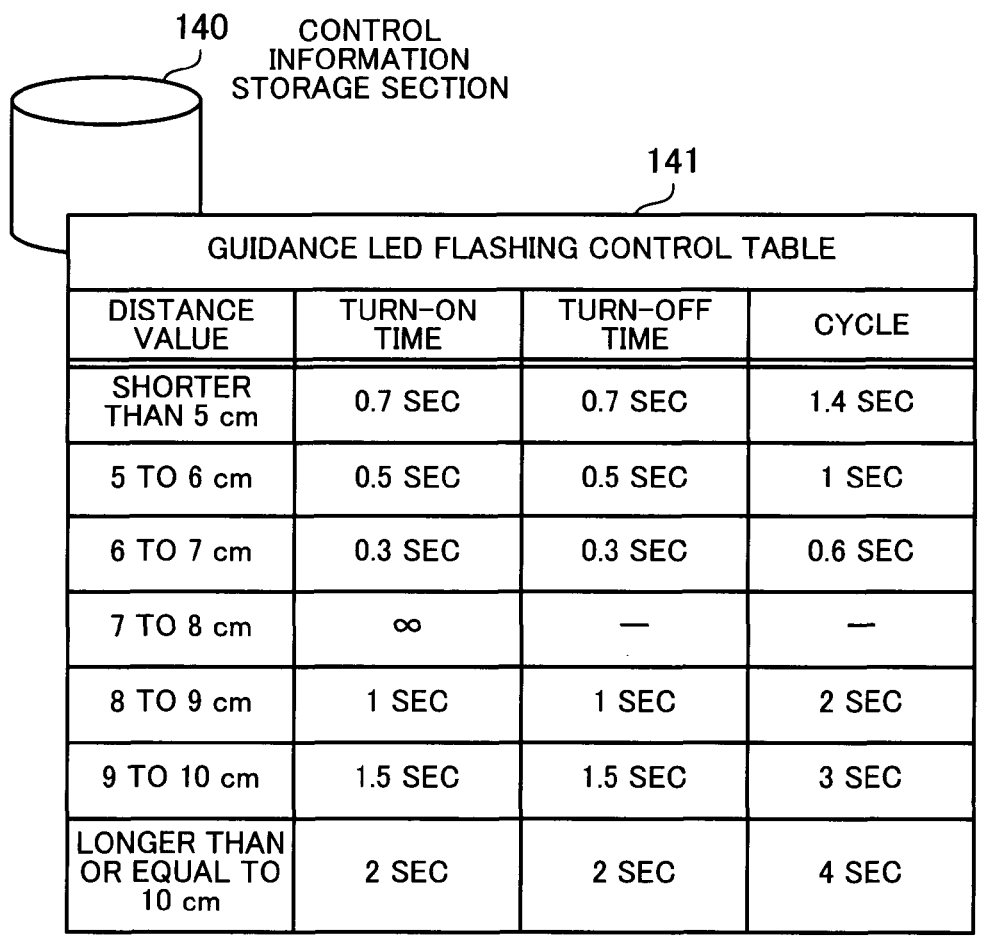
FIG. 6 illustrates an example of the data structure of a guidance LED flashing control table.

FIG. 6 illustrates an example of the data structure of a guidance LED flashing control table. A guidance LED flashing control table 141 is stored in the control information storage section 140. The guidance LED flashing control table 141 includes Distance Value, Turn-on Time, Turn-off Time, and Cycle items. Pieces of information horizontally arranged in these items are associated with one another and make up a piece of control information.

Information indicative of the distance between the palm and the image capture section 110 is set in the Distance Value item. Time for which the guidance LED 115 is turned on is set in the Turn-on Time item. Time for which the guidance LED 115 is turned off is set in the Turn-off Time item. Time corresponding to one cycle including turn-on time and turn-off time is set in the Cycle item. Time set in the Cycle item is the sum of turn-on time and turn-off time.

For example, information made up of the distance value "less than 5 cm," the turn-on time "0.7 sec," the turn-off time "0.7 sec," and the cycle "1.4 sec" is set in the guidance LED flashing control table 141. This information means that if the distance between the palm and the image capture section 110 calculated by the distance calculation unit 132 is "less than 5 cm," then the guidance LED 115 113 is made to flash in a "1.4-second" cycle, that the distance measuring LED 113 is turned on for 0.7 seconds of 1.4 seconds, and that the distance measuring LED 113 is turned off for 0.7 seconds of 1.4 seconds.

In the example of FIG. 6, the distance suitable for image capture is "7 to 8 cm." In this case, the guidance LED 115 is not made to flash. That is to say, the guidance LED 115 is always turned on. If the distance is shorter than "7 to 8 cm," then the guidance LED 115 is made to flash in a short cycle. If the distance is longer than "7 to 8 cm," then the guidance LED 115 is made to flash in a long cycle.

The guidance LED 115 is made to flash in this way in a cycle corresponding to the distance between the palm and the image capture section 110. This can prompt the user to bring the image capture section 110 far from or close to the palm. In addition, when the distance between the palm and the image capture section 110 is suitable for image capture, image capture may be performed automatically. This makes operation input, such as pressing down a button, by the user unnecessary and the influence of an unintentional movement of a hand can be reduced.

Changing the duty ratio of flashing (ratio of flashing time) may be adopted as a flashing method in place of changing a cycle in the above way according to the distance between the palm and the image capture section 110. For example, a cycle corresponding to each distance value is fixed at 2 seconds. If the distance between the palm and the image capture section 110 is short, time for which the guidance LED 115 is turned on is made shorter than time for which the guidance LED 115 is turned off. If the distance between the palm and the image capture section 110 is long, time for which the guidance LED 115 is turned on is made longer than time for which the guidance LED 115 is turned off.

Figure 7:
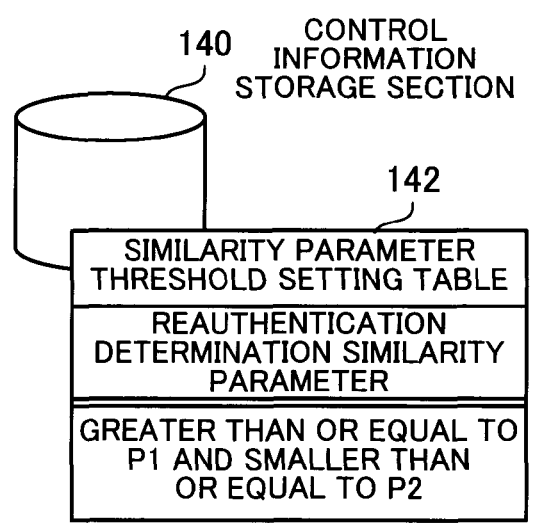
FIG. 7 illustrates an example of the data structure of a similarity parameter threshold setting table.

FIG. 7 illustrates an example of the data structure of a similarity parameter threshold setting table. A similarity parameter threshold setting table 142 is stored in the control information storage section 140. The similarity parameter threshold setting table 142 includes a Reauthentication Determination Similarity Parameter item.

The range of similarity parameter in which the comparison unit 135 determines that reauthentication is necessary is set in the Reauthentication Determination Similarity Parameter item.

For example, the information that reauthentication determination similarity parameter is "greater than or equal to P1 and smaller than or equal to P2" is set in the similarity parameter threshold setting table 142. This means the following. If similarity parameter which the comparison unit 135 calculates on the basis of a vein pattern acquired by image capture at authentication time and a vein pattern registered in advance in the authentication information storage section 150 is "greater than or equal to P1 and smaller than or equal to P2," then the comparison unit 135 determines that reauthentication is necessary.

Figure 8:
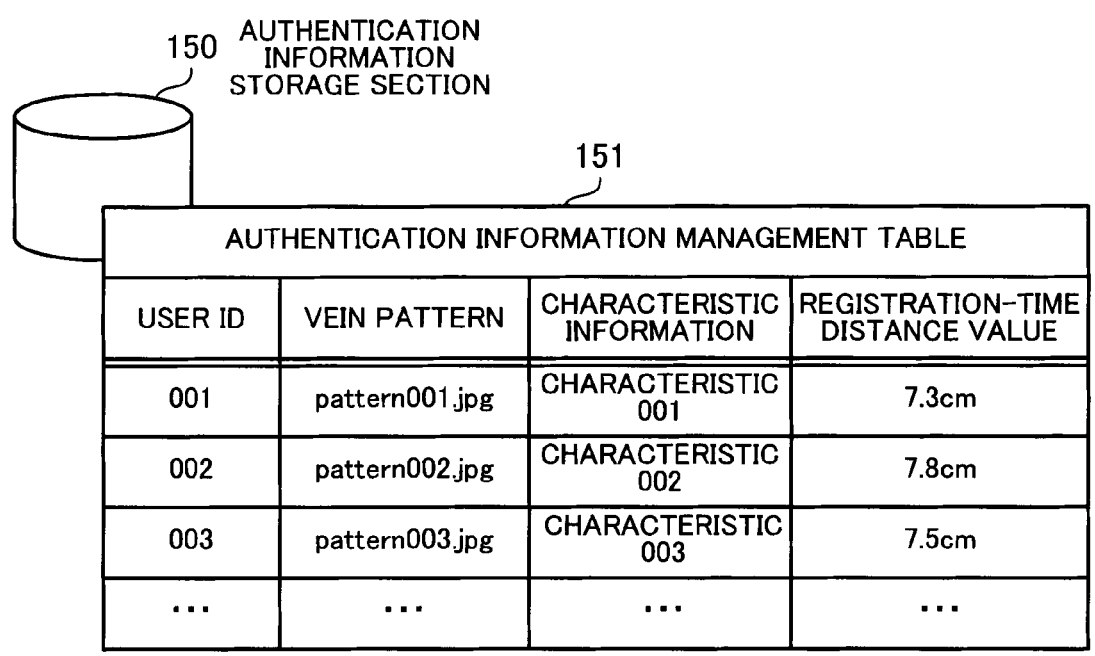
FIG. 8 illustrates an example of the data structure of an authentication information management table.

FIG. 8 illustrates an example of the data structure of an authentication information management table. An authentication information management table 151 is stored in the authentication information storage section 150. The authentication information management table 151 includes User ID (IDentifier), Vein Pattern, Characteristic Information, and Registration-time Distance value items. Pieces of information horizontally arranged in these items are associated with one another and make up a piece of authentication information.

Identification information given to a user is set in the User ID item. An image file of the vein pattern of the user registered in advance is set in the Vein Pattern item. Information indicative of a characteristic of the vein pattern is set in the Characteristic Information item. Information indicative of the distance between the palm and the image capture section 110 at the time of capturing an image of the vein pattern registered in advance is set in the Registration-time Distance value item.

For example, information made up of the user ID "001," the vein pattern "pattern001.jpg," the characteristic information "characteristic001," and the registration-time distance value "7.3 cm" is set in the authentication information management table 151.

Information indicated by "characteristic001" may be, for example, information indicative of a characteristic (such as the placement of thick veins) of a vein pattern included in "pattern001.jpg". By extracting characteristic information from a vein pattern in this way, comparison at authentication time can be made not only by the use of the vein pattern itself but also by the use of the characteristic information.

A plurality of vein patterns of the same user may be registered in advance in the authentication information management table 151. By doing so, the comparison unit 135 can perform identity confirmation by selecting one of the plurality of vein patterns that is most similar to a vein pattern acquired by image capture at authentication time. As a result, the possibility of erroneously determining, in spite of the vein pattern acquired by image capture at authentication time being the vein pattern of the user, that the vein pattern acquired by image capture at authentication time is not the vein pattern of the user can be reduced.

Figure 9:
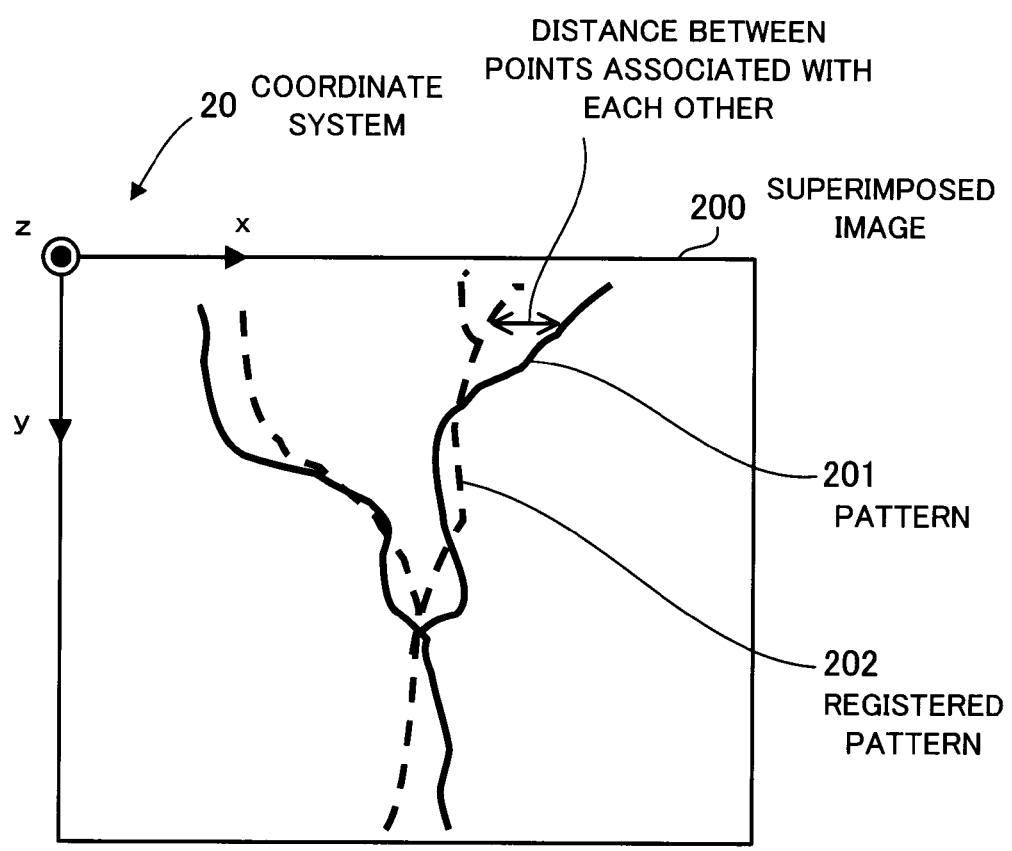
FIG. 9 illustrates examples of vein patterns acquired by image capture at registration time and authentication time.

FIG. 9 illustrates examples of vein patterns acquired by image capture at registration time and authentication time. A pattern 201 and a registered pattern 202 are indicated in a superimposed image 200.

The pattern 201 is a vein pattern acquired by image capture at authentication time.

The registered pattern 202 is a vein pattern registered in advance in the authentication information management table 151 stored in the authentication information storage section 150.

A coordinate system 20 is for the superimposed image 200. The upper left-hand corner of the superimposed image 200 is the origin of the coordinate system 20. The direction from left to right on the superimposed image 200 is a positive x-axis direction. The direction from top to bottom on the superimposed image 200 is a positive y-axis direction. The direction from the superimposed image 200 to this side is a positive z-axis direction.

The comparison unit 135 associates a point component included in the pattern 201 with a point component included in the registered pattern 202. This association is performed, for example, under the condition that points having the same y value and having x values the difference between which is smaller are associated with each other. The comparison unit 135 then calculates the distance between points associated with each other and finds the sum total of distance values. A value obtained is similarity parameter. That is to say, the similarity parameter "0" indicates that the pattern 201 and the registered pattern 202 match completely. As similarity parameter becomes larger, the degree of nonsimilarity becomes higher.

However, conditions (such as distance, a position, and a tilt) under which image capture is performed at registration time and authentication time are not necessarily the same. Accordingly, positioning is performed in order to determine similarity parameter. To be concrete, the pattern 201 is translated and rotated so that the similarity parameter between the pattern 201 and the registered pattern 202 will become small.

A translation process is performed by calculating translation, for example, in x-y coordinates. Translation in the z-axis direction can be calculated as the enlargement or contraction of the pattern 201.

A rotation process is performed by calculating rotation, for example, on an axis parallel to the z-axis, an axis parallel to the x-axis, or an axis parallel to the y-axis (perspective transformation). Each time the comparison unit 135 performs these process on the pattern 201, the comparison unit 135 recalculates the similarity parameter. The comparison unit 135 repeats these processes until the minimum similarity parameter is obtained. These similarity parameter calculations can be performed by DP (Dynamic Programming) matching.

Figure 10:
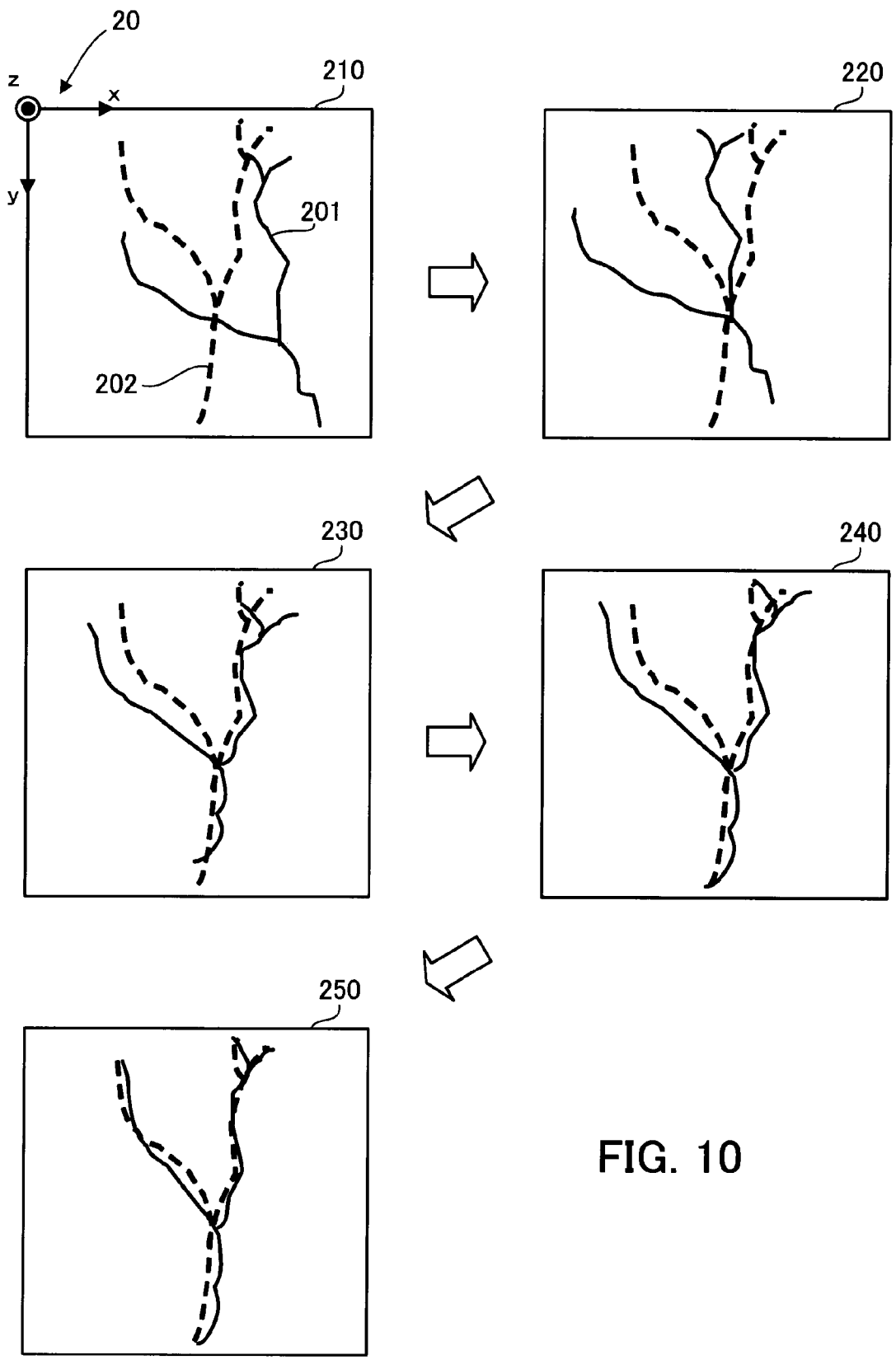
FIG. 10 illustrates a concrete example of a vein pattern positioning method.

FIG. 10 illustrates a concrete example of a vein pattern positioning method. A superimposed image 210 indicates a state in which a positioning process is not yet performed on the pattern 201.

First the comparison unit 135 translates the pattern 201 in the x-axis and y-axis directions. A direction and distance in a translation process which minimize the similarity parameter are specified as the final direction and distance of the translation. A superimposed image 220 indicates a state in which this translation process has been performed.

The comparison unit 135 then rotates the pattern 201, for example, on an axis parallel to the z-axis. A rotational angle in a rotation process which minimizes the similarity parameter is specified as the final angle of the rotation on the axis parallel to the z-axis. A superimposed image 230 indicates a state in which this rotation process on the axis parallel to the z-axis has been performed.

The comparison unit 135 then rotates the pattern 201, for example, on an axis parallel to the x-axis. A rotational angle in a rotation process which minimizes the similarity parameter is specified as the final angle of the rotation on the axis parallel to the x-axis. A superimposed image 240 indicates a state in which this rotation process on the axis parallel to the x-axis has been performed.

The comparison unit 135 then rotates the pattern 201, for example, on an axis parallel to the y-axis. A rotational angle in a rotation process which minimizes the similarity parameter is specified as the final angle of the rotation on the axis parallel to the y-axis. A superimposed image 250 indicates a state in which this rotation process on the axis parallel to the y-axis has been performed.

On the basis of the pattern 201 in the superimposed image 250 obtained as a result of positioning by the comparison unit 135, the positioning information acquisition unit 136 can acquire positioning information. The positioning information includes a positional deviation amount in the x-axis direction, a positional deviation amount in the y-axis direction, a positional deviation amount in the z-axis direction, the amount of a rotation on an axis parallel to the x-axis, the amount of a rotation on an axis parallel to the y-axis, the amount of a rotation on an axis parallel to the z-axis, and the like. It is safe to think that this positioning information makes up the difference between the relative position of the palm with respect to the image capture section 110 at the time of acquiring the pattern 201 and the relative position of the palm with respect to the image capture section 110 at the time of acquiring the registered pattern 202.

The comparison unit 135 can acquire the minimum similarity parameter in this way. On the basis of the minimum similarity parameter acquired, the comparison unit 135 performs identity confirmation.

Figure 11:
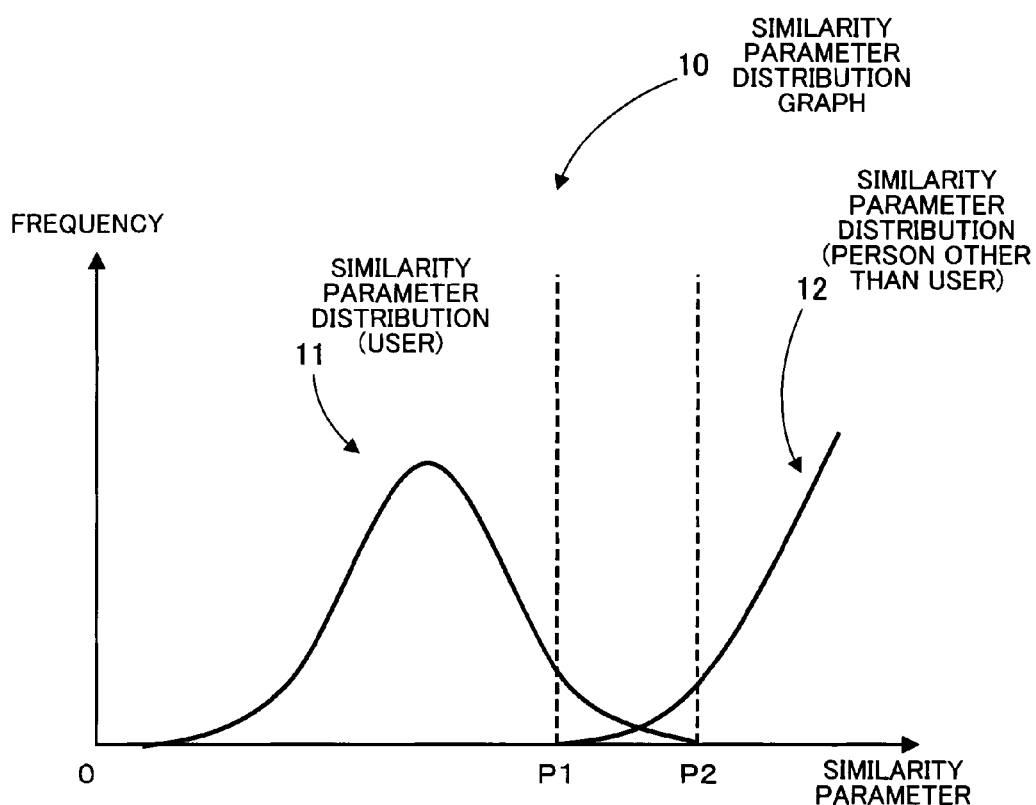
FIG. 11 illustrates similarity parameter distribution at vein pattern comparison time.

FIG. 11 illustrates similarity parameter distribution at vein pattern comparison time. In FIG. 11, a horizontal axis indicates similarity parameter and a vertical axis indicates a frequency. A similarity parameter distribution graph includes similarity parameter distribution 11 and similarity parameter distribution 12.

The similarity parameter distribution 11 is the distribution of similarity parameter calculated in the case of vein patterns at registration time and authentication time between which the comparison unit 135 finds a matching in a comparison (in the case of a vein pattern at authentication time being the vein pattern of the user).

The similarity parameter distribution 12 is the distribution of similarity parameter calculated in the case of vein patterns at registration time and authentication time between which the comparison unit 135 finds a non-matching in a comparison (in the case of a vein pattern at authentication time being the vein pattern of a person other than the user).

As stated above, if similarity parameter is greater than or equal to 0 and is smaller than P1, then the comparison unit 135 determines that the vein pattern at authentication time is the vein pattern of the user. In this case, a comparison result is "Yes." If similarity parameter is greater than or equal to P1 and is smaller than or equal to P2, the comparison unit 135 cannot determine whether or not the vein pattern at authentication time is the vein pattern of the user. Accordingly, the comparison unit 135 determines that capturing an image of the vein pattern again and performing reauthentication are necessary. The similarity parameter P1 and the similarity parameter P2 are set in advance in the similarity parameter threshold setting table 142 stored in the control information storage section 140 as values at both ends of an area where lower portions of the similarity parameter distribution 11 and the similarity parameter distribution 12 overlap. In addition, if similarity parameter is greater than P2, then the comparison unit 135 determines that the vein pattern at authentication time is the vein pattern of a person other than the user. In this case, a comparison result is "No."

If the comparison unit 135 determines as a result of the comparison that reauthentication is necessary, then the positioning information acquisition unit 136 acquires positioning information on the basis of the result of positioning by the comparison unit 135 illustrated in FIG. 10. On the basis of the positioning information, the guidance information output unit 137 then generates guidance information for guiding the user. The guidance information includes information indicative of the contents of an indicator image which the guidance LED 115 or 115*a* projects and the position at which the indicator image is projected.

Figures 12A, 12B:
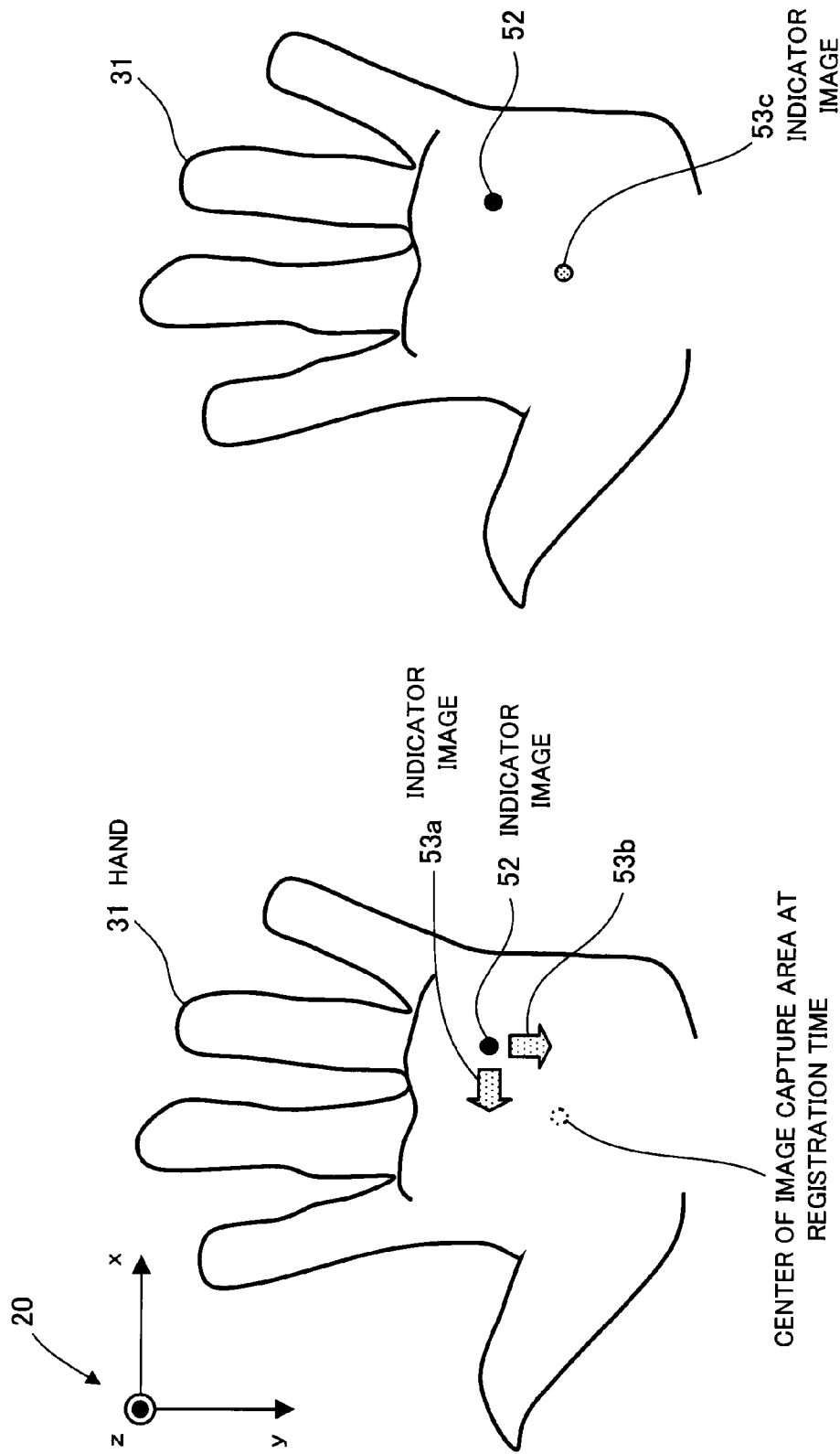
FIGS. 12A and 12B illustrate concrete examples of indicator images projected by guidance LEDs.

FIGS. 12A and 12B illustrate concrete examples of indicator images projected by the guidance LEDs. In the case of FIG. 12A, arrows are projected as indicator images. In the case of FIG. 12B, spot images are projected as indicator images. In these examples, only indicator images for prompting movement on a palm (x-y plane) of a hand 31 are indicated for the sake of intelligibility.

It is assumed that the positioning information acquisition unit 136 acquires positional deviations in the negative x-axis direction and the positive y-axis direction between a registered vein pattern and a vein pattern acquired by image capture at authentication time as positioning information as a result of similarity parameter calculations by the comparison unit 135.

In the case of FIG. 12A, the guidance information output unit 137 outputs instructions to project an indicator image 52 at the center of a current image capture area as guidance information. Furthermore, the guidance information output unit 137 outputs instructions to project an indicator image 53*a* for prompting the user to move the indicator image 52 in the negative x-axis direction as guidance information. In addition, the guidance information output unit 137 outputs instructions to project an indicator image 53*b* for prompting the user to move the indicator image 52 in the positive y-axis direction as guidance information. On the basis of the guidance information acquired from the guidance information output unit 137, the guidance LED drive unit 119 projects the indicator image 52 on the hand 31, for example, by the use of the guidance LED 115. In addition, the guidance LED drive unit 119 projects the indicator images 53*a* and 53*b* on the hand 31 by the use of the guidance LED 115*a*.

In the case of FIG. 12B, the guidance information output unit 137 outputs instructions to project an indicator image 52 at the center of a current image capture area as guidance information. Furthermore, the guidance information output unit 137 outputs instructions to project an indicator image 53*c* at the center of an image capture area at vein pattern registration time as guidance information. On the basis of the guidance information acquired from the guidance information output unit 137, the guidance LED drive unit 119 projects the indicator image 52 on the hand 31, for example, by the use of the guidance LED 115. In addition, the guidance LED drive unit 119 projects the indicator image 53*c* on the hand 31 by the use of the guidance LED 115*a*.

The indicator images are projected on the hand 31 in this way to guide the center of the current image capture area to the center of the image capture area at vein pattern registration time. This makes it possible to inform the user about the proper position of the portable telephone 100. Spots used for guidance are not limited to the centers of the image capture areas at authentication time and registration time. Other spots may by used.

In the above description the indicator images for indicating the direction in which the image capture section 110 should be moved with respect to the palm are used. However, indicator images for indicating the direction in which the palm should be moved with respect to the image capture section 110 may be used.

Processes performed by the portable telephone 100 having the above structure will now be described. First a process for registering the vein pattern of the user will be described.

Figure 13:
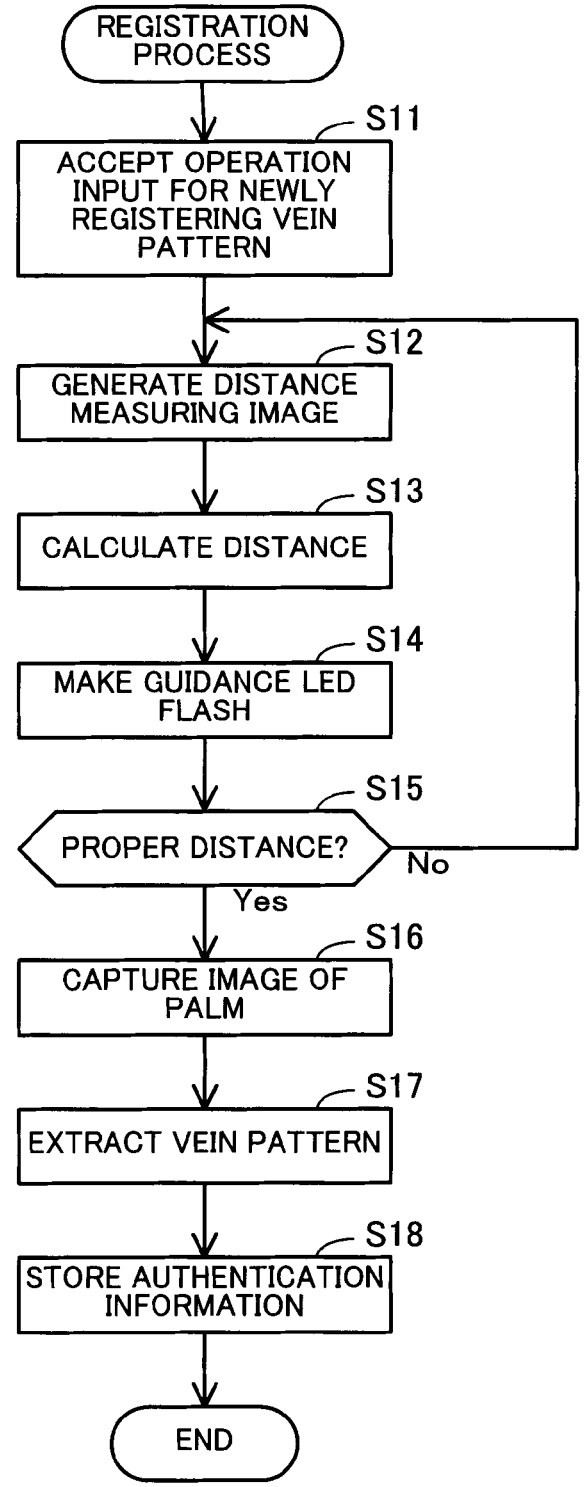
FIG. 13 is a flow chart of a procedure for a vein pattern registration process.

FIG. 13 is a flow chart of a procedure for a vein pattern registration process. A process illustrated in FIG. 13 will now be described in order of step number.

(Step S11) The input processing section 125 accepts operation input provided by the user by the use of the button 102 or the keypad 103 for newly registering the vein pattern of the user. The input processing section 125 outputs instructions according to the accepted operation input to the image capture control unit 131 to capture an image for newly registering the vein pattern. The image capture control unit 131 accepts from input processing section 125 the instructions to capture an image.

(Step S12) The image capture control unit 131 gives the distance measuring LED drive unit 117 instructions to turn on the distance measuring LEDs 113 and 113*a*. The image capture control unit 131 then gives the image sensor 112 and the A/D conversion unit 116 instructions to capture an image of a palm and generate a distance measuring image respectively. When the image sensor 112 accepts the instructions, the image sensor 112 captures an image of the palm. The A/D conversion unit 116 converts analog output from each of the light receiving elements which make up the image sensor 112 to a digital value, and generates a distance measuring image.

(Step S13) On the basis of the distance measuring image generated by the A/D conversion unit 116, the distance calculation unit 132 calculates the distance between the palm and the image capture section 110. The distance calculation unit 132 outputs the calculated distance to the guidance light flashing instruction unit 133 and the image capture control unit 131.

(Step S14) The guidance light flashing instruction unit 133 acquires the distance between the palm and the image capture section 110 from the distance calculation unit 132. The guidance light flashing instruction unit 133 then refers to the guidance LED flashing control table 141 stored in the control information storage section 140, and acquires a method for making the guidance LED 115 flash which corresponds to the value of the acquired distance. The guidance light flashing instruction unit 133 informs the guidance LED drive unit 119 of the acquired method for making the guidance LED 115 flash. The guidance LED drive unit 119 makes the guidance LED 115 flash, according to the method of which it is informed. It is assumed that an indicator image which the guidance LED 115 projects at this time on the palm is a mere spot image obtained by a light beam.

(Step S15) The image capture control unit 131 determines whether or not the distance acquired from the distance calculation unit 132 is proper for image capture. If the distance acquired from the distance calculation unit 132 is proper for image capture, then step S16 is performed. If the distance acquired from the distance calculation unit 132 is not proper for image capture, then step S12 is performed. On the basis of the guidance LED flashing control table 141 stored in the control information storage section 140, the image capture control unit 131 can make this determination. That is to say, if the distance acquired from the distance calculation unit 132 is "7 to 8 cm" at which the guidance LED 115 is always turned on according to the guidance LED flashing control table 141, then the image capture control unit 131 determines that the distance acquired from the distance calculation unit 132 is proper for image capture. If the distance acquired from the distance calculation unit 132 is not "7 to 8 cm," then the image capture control unit 131 determines that the distance acquired from the distance calculation unit 132 is not proper for image capture.

(Step S16) The image capture control unit 131 gives the image capture LED drive unit 118 instructions to turn on the image capture LEDs 114, 114*a*, 114*b*, and 114*c*. In addition, the image capture control unit 131 gives the image sensor 112 and the A/D conversion unit 116 instructions to capture an image of the palm and generate a vein image respectively. When the image sensor 112 accepts the instructions, the image sensor 112 captures an image of the palm. The A/D conversion unit 116 converts analog output from each of the light receiving elements which make up the image sensor 112 to a digital value, and generates a vein image.

(Step S17) The vein extraction unit 134 performs an edge enhancement process on the vein image generated by the A/D conversion unit 116, and extracts a vein pattern.

(Step S18) The vein extraction unit 134 stores the extracted vein pattern, together with information such as a user ID and characteristic information for the extracted vein pattern, in the authentication information management table 151 stored in the authentication information storage section 150. Information indicative of the distance between the palm and the image capture section 110 at the time of capturing an image of the palm in the above step S16 is included in the information which the vein extraction unit 134 stores in the authentication information management table 151 stored in the authentication information storage section 150.

The portable telephone 100 can register in this way the vein pattern of the user in advance in the authentication information storage section 150. At this time, as described in the above step S14, the guidance LED 115 is made to flash in a cycle corresponding to the distance between the palm and the image capture section 110. To be concrete, as set in the guidance LED flashing control table 141, for example, the guidance LED 115 is made to flash in a short cycle at the time of the distance between the palm and the image capture section 110 being shorter than a proper distance. The guidance LED 115 is made to flash in a long cycle at the time of the distance between the palm and the image capture section 110 being longer than the proper distance. This can prompt the user to bring the image capture section 110 far from or close to the palm. In addition, when the distance between the palm and the image capture section 110 is proper for image capture, image capture may be performed automatically. This makes operation input, such as pressing down a button, by the user unnecessary and the influence of an unintentional movement of a hand can be reduced.

If authentication is performed in a state in which the user holds the portable telephone 100 in his/her hand, an unintentional movement of the hand may have an influence during the exposure of the image sensor 112 to light. Therefore, an unintentional movement of the hand can be determined in the following ways.

A first method is as follows. The distance between the palm and the image capture section 110 is measured by the use of the distance measuring LED 113 before and after image capture by the image sensor 112. The difference between the distance between the palm and the image capture section 110 before the image capture and the distance between the palm and the image capture section 110 after the image capture is calculated. If this difference value is greater than or equal to a determined value, then the determination that an unintentional movement of the hand is recognized is made and image capture is performed again.

A second method is as follows. Two vein images are continuously captured by the image sensor 112. It is assumed that exposure time is the same at the time of capturing the two vein images. The two vein images are captured in a short period of time, so they are approximately the same. The difference in luminance value between the two vein images is found. In this case, the difference in luminance value is large in portions between which there is a deviation. An area including such a portion is extracted and the ratio of this area to the entire image area is calculated. If the calculated ratio is higher than or equal to a determined ratio, then the determination that an unintentional movement of the hand is recognized is made and image capture is performed again.

The above first or second method is used for determining whether an unintentional movement of the hand is recognized. If the determination that an unintentional movement of the hand is recognized is made, an image of the vein pattern is captured again. By doing so, a clearer vein pattern can be obtained. As a result, authentication accuracy at user authentication time can be improved.

A process for performing authentication by the use of a registered vein pattern will be described next.

Figure 14:
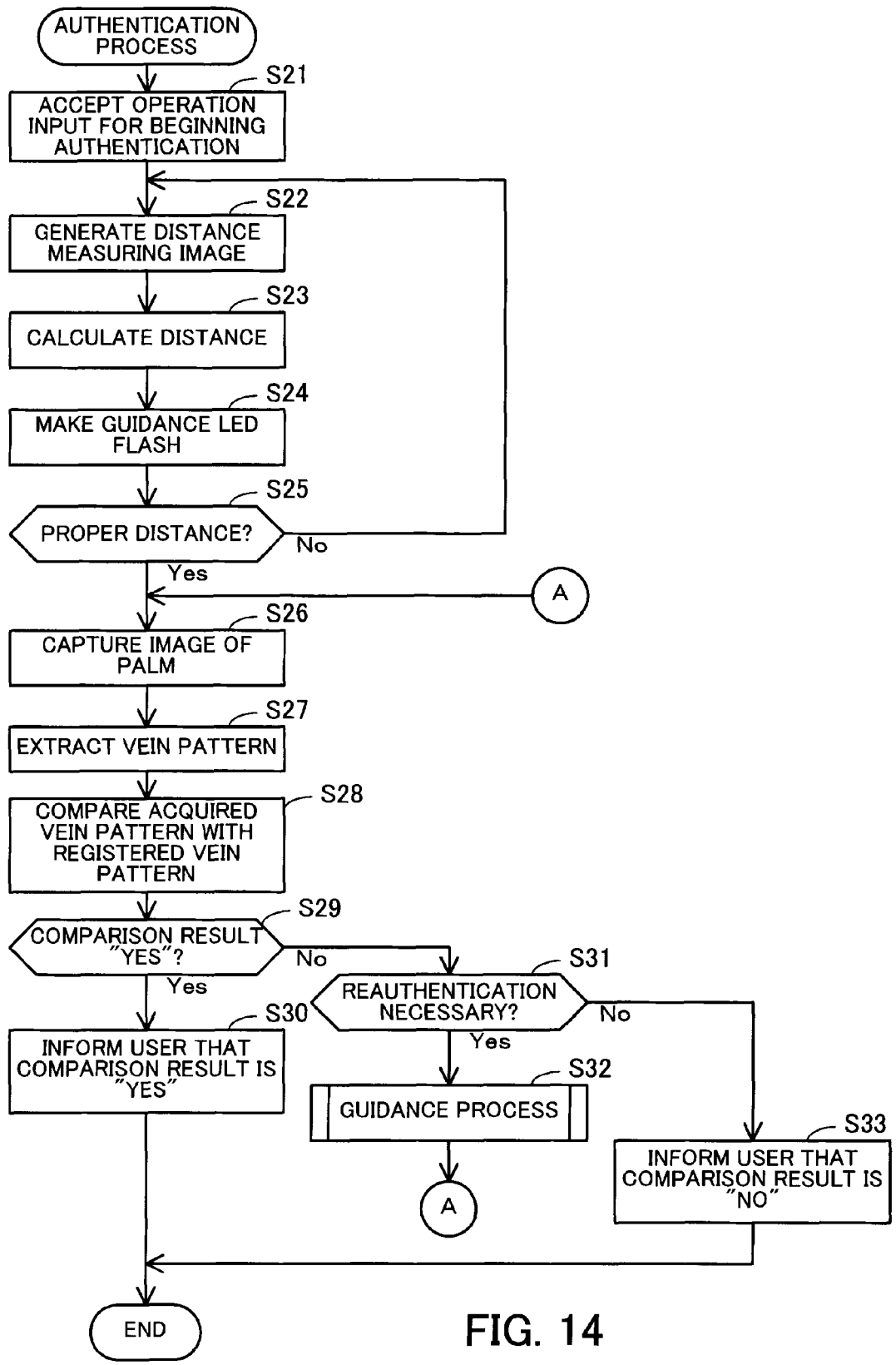
FIG. 14 is a flow chart of a procedure for an authentication process.

FIG. 14 is a flow chart of a procedure for an authentication process. A process illustrated in FIG. 14 will now be described in order of step number.

(Step S21) The input processing section 125 accepts operation input provided by the user by the use of the button 102 or the keypad 103 for beginning vein authentication. The input processing section 125 outputs instructions according to the accepted operation input to the image capture control unit 131 to capture an image for performing vein authentication. The image capture control unit 131 accepts from input processing section 125 the instructions to capture an image.

(Step S22) The image capture control unit 131 gives the distance measuring LED drive unit 117 instructions to turn on the distance measuring LED 113. The image capture control unit 131 then gives the image sensor 112 and the A/D conversion unit 116 instructions to capture an image of a palm and generate a distance measuring image respectively. When the image sensor 112 accepts the instructions, the image sensor 112 captures an image of the palm. The A/D conversion unit 116 converts analog output from each of the light receiving elements which make up the image sensor 112 to a digital value, and generates a distance measuring image.

(Step S23) On the basis of the distance measuring image generated by the A/D conversion unit 116, the distance calculation unit 132 calculates the distance between the palm and the image capture section 110. The distance calculation unit 132 outputs the calculated distance to the guidance light flashing instruction unit 133 and the image capture control unit 131.

(Step S24) The guidance light flashing instruction unit 133 acquires the distance between the palm and the image capture section 110 from the distance calculation unit 132. The guidance light flashing instruction unit 133 then refers to the guidance LED flashing control table 141 stored in the control information storage section 140, and acquires a method for making the guidance LED 115 flash which corresponds to the value of the acquired distance. The guidance light flashing instruction unit 133 informs the guidance LED drive unit 119 of the acquired method for making the guidance LED 115 flash. The guidance LED drive unit 119 makes the guidance LED 115 flash, according to the method of which it is informed. It is assumed that an indicator image which the guidance LED 115 projects at this time on the palm is a mere spot image obtained by a light beam.

(Step S25) The image capture control unit 131 determines whether or not the distance acquired from the distance calculation unit 132 is proper for image capture. If the distance acquired from the distance calculation unit 132 is proper for image capture, then step S26 is performed. If the distance acquired from the distance calculation unit 132 is not proper for image capture, then step S22 is performed. As described in step S15 of FIG. 13, the image capture control unit 131 can make this determination by referring to the guidance LED flashing control table 141 stored in the control information storage section 140.

(Step S26) The image capture control unit 131 gives the image capture LED drive unit 118 instructions to turn on the image capture LEDs 114, 114a, 114b, and 114c. In addition, the image capture control unit 131 gives the image sensor 112 and the A/D conversion unit 116 instructions to capture an image of the palm and generate a vein image respectively. When the image sensor 112 accepts the instructions, the image sensor 112 captures an image of the palm. The A/D conversion unit 116 converts analog output from each of the light receiving elements which make up the image sensor 112 to a digital value, and generates a vein image.

(Step S27) The vein extraction unit 134 performs an edge enhancement process on the vein image generated by the A/D conversion unit 116, and extracts a vein pattern. The vein extraction unit 134 outputs the extracted vein pattern to the comparison unit 135.

(Step S28) The comparison unit 135 compares the vein pattern acquired from the vein extraction unit 134 with a vein pattern registered in the authentication information management table 151 stored in the authentication information storage section 150, and calculates similarity parameter. If a user ID of the user is also inputted in the above step S21, then the comparison unit 135 can specify an image file of the vein pattern of the user in the authentication information management table 151 on the basis of the user ID. If the user ID of the user is not inputted, then the comparison unit 135 compares the vein pattern acquired from the vein extraction unit 134 with an image file of the vein pattern of each user registered in the authentication information management table 151. As described in FIGS. 9 and 10, the comparison unit 135 translates and rotates the vein pattern acquired from the vein extraction unit 134, and can find the minimum similarity parameter by the DP matching.

(Step S29) The comparison unit 135 determines whether a comparison result is "Yes" or not. The comparison unit 135 can make this determination on the basis of whether the similarity parameter calculated in the above step S28 is smaller than P1 or not. That is to say, if the similarity parameter is smaller than P1, then a comparison result is "Yes". If the similarity parameter is larger than or equal to P1, then the comparison unit 135 does not determine that a comparison result is "Yes". If a comparison result is "Yes," then step S30 is performed. If a comparison result is not "Yes," then step S31 is performed.

(Step S30) The comparison unit 135 informs the user that a comparison result is "Yes". The comparison unit 135 gives the user this notice by sound, for example, via the voice processing section 126 and the speaker 105. In addition, the comparison unit 135 gives the user this notice for example, by making the display processing section 127 display a determined massage or image on the display 106. If the guidance LED 115 or 115a is on at this time, then the comparison unit 135 gives the guidance LED drive unit 119 instructions to turn off the guidance LED 115 or 115a.

(Step S31) The comparison unit 135 determines whether reauthentication is necessary or not. The comparison unit 135 can make this determination on the basis of whether or not the similarity parameter calculated in the above step S28 is larger than or equal to P1 and is smaller than or equal to P2. That is to say, if the similarity parameter calculated in the above step S28 is larger than or equal to P1 and is smaller than or equal to P2, then the comparison unit 135 determines that reauthentication is necessary. If the similarity parameter calculated in the above step S28 is not within this range, then the comparison unit 135 determines that reauthentication is unnecessary. If reauthentication is necessary, then step S32 is performed. If reauthentication is unnecessary, then step S33 is performed.

(Step S32) The positioning information acquisition unit 136 acquires positioning information on the basis of an pattern 201 of a superimposed image 200 obtained as a result of positioning by the comparison unit 135. On the basis of the positioning information acquired by the positioning information acquisition unit 136, the guidance information output unit 137 generates guidance information indicative of the contents of an indicator image and the position at which the indicator image is projected, and outputs the guidance information to the guidance LED drive unit 119. On the basis of the guidance information acquired from the guidance information output unit 137, the guidance LED drive unit 119 makes the guidance LED 115 or 115a project the indicator image for guidance on the palm. Step S26 is then performed.

(Step S33) The comparison unit 135 informs the user that a comparison result is "No". The comparison unit 135 gives the user this notice by sound, for example, via the voice processing section 126 and the speaker 105. In addition, the comparison unit 135 gives the user this notice for example, by making the display processing section 127 display a determined massage or image on the display 106.

The portable telephone 100 can perform authentication in this way by the use of palm veins. At this time, as described in the above step S24, the guidance LED 115 is made to flash in a cycle corresponding to the distance between the palm and the image capture section 110. To be concrete, as set in the guidance LED flashing control table 141, for example, the guidance LED 115 is made to flash in a short cycle at the time of the distance between the palm and the image capture section 110 being shorter than a proper distance. The guidance LED 115 is made to flash in a long cycle at the time of the distance between the palm and the image capture section 110 being longer than the proper distance. This can prompt the user to bring the image capture section 110 far from or close to the palm. In addition, when the distance between the palm and the image capture section 110 is proper for image capture, image capture may be performed automatically. This makes operation input, such as pressing down a button, by the user unnecessary and the influence of an unintentional movement of a hand can be reduced. Furthermore, determination of an unintentional movement of a hand described in the registration process can also be used at the time of capturing an image of a vein pattern in the authentication process.

In the above step S25 the image capture control unit 131 may refer to information indicative of registration-time distance set in the authentication information management table 151 stored in the authentication information storage section 150 in order to determine whether or not the distance acquired from the distance calculation unit 132 is proper for image capture. By doing so, even if the distance between the palm and the image capture section 110 is between 7 and 8 cm, the image capture control unit 131 determines more strictly whether or not the distance is proper for image capture. As a result, the reproducibility of conditions under which image capture is performed at registration time can be increased. If the image capture control unit 131 determines that the distance between the palm and the image capture section 110 is not proper for image capture, then the guidance light flashing instruction unit 133 may, for example, control a method for making the distance measuring LED 113 flash by dividing a distance range of 7 to 8 cm more finely. In addition, the guidance light flashing instruction unit 133 may prompt the user with voice, for example, via the voice processing section 126 and the speaker 105 to finely adjust the distance between the palm and the image capture section 110.

The guidance process performed in the above step S32 will now be described in further detail.

Figure 15:
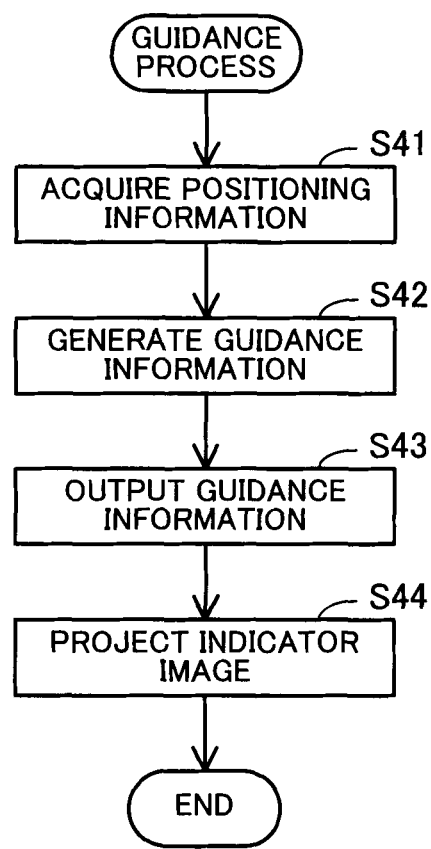
FIG. 15 illustrates is a flow chart of a procedure for a guidance process.

FIG. 15 illustrates is a flow chart of a procedure for the guidance process. The process illustrated in FIG. 15 will now be described in order of step number. The following description will be given for describing in detail the process performed in step S32 of FIG. 14.

(Step S41) On the basis of the result of positioning by the comparison unit 135, the positioning information acquisition unit 136 acquires positioning information. The positioning information includes a positional deviation amount in the x-axis direction, a positional deviation amount in the y-axis direction, a positional deviation amount in the z-axis direction, the amount of a rotation on an axis parallel to the x-axis, the amount of a rotation on an axis parallel to the y-axis, and the amount of a rotation on an axis parallel to the z-axis. The positioning information acquisition unit 136 outputs the acquired positioning information to the guidance information output unit 137.

(Step S42) On the basis of the positioning information acquired from the positioning information acquisition unit 136, the guidance information output unit 137 generates guidance information. The guidance information includes information indicative of the contents of an indicator image which the guidance LED 115 or 115a projects and the position at which the indicator image is projected. As illustrated in FIG. 12, the contents of the indicator image may be an arrow indicative of the direction in which the image capture section 110 should be moved for correcting a positional deviation, for example, in the x-axis or y-axis direction. The information indicative of the position at which the indicator image is projected may be, for example, information indicative of the position of the center of an image capture area at registration time with respect to the center of a current image capture area. Furthermore, voice information for prompting the user with voice to correct a positional deviation in the z-axis direction or a rotation on an axis parallel to each axis or display information for prompting the user with image display to correct a positional deviation in the z-axis direction or a rotation on an axis parallel to each axis may be used.

(Step S43) The guidance information output unit 137 outputs the guidance information to the guidance LED drive unit 119.

(Step S44) On the basis of the guidance information acquired from the guidance information output unit 137, the guidance LED drive unit 119 changes the indicator image which the guidance LED 115 or 115a projects. In addition, the guidance LED drive unit 119 changes the position of the guidance LED 115 or 115a to change the position at which the indicator image is projected.

When reauthentication is performed, the guidance information output unit 137 outputs guidance information in this way for prompting a change in the placement of the image capture section 110 and the palm. On the basis of this guidance information, an indicator image for guidance is projected on the palm by the guidance LED 115 or 115a.

The process from steps S26 through S32 of FIG. 14 can be performed, for example, in about 500 milliseconds. As a result, the above indicator image is also updated in about 500-millisecond cycle. Therefore, the user views the indicator image updated at any time in this cycle, and can change the position of the image capture section 110 accurately. As a result, the reproducibility of the placement of the palm and the image capture section 110 at vein pattern registration time increases and efficiency and accuracy in authentication can be improved.

An indicator image may be updated by a process other than the update of the indicator image by the above guidance process. To be concrete, an acceleration sensor may be included in the portable telephone 100. As a result, distance by which the user moves the portable telephone 100 can be calculated by second-order-integrating acceleration measured by the acceleration sensor. Accordingly, the guidance information output unit 137 can update the contents of guidance by an indicator image according to the distance.

Figure 16:
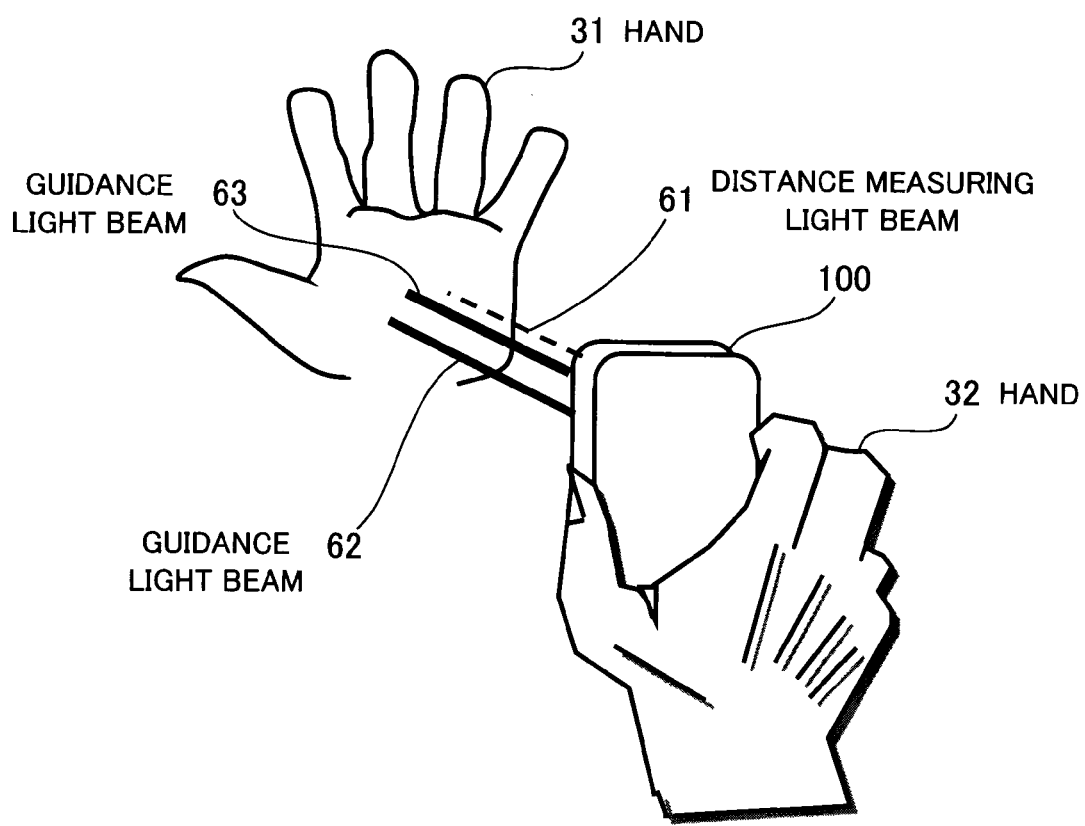
FIG. 16 illustrates a concrete example of a use for the portable telephone at authentication time.

FIG. 16 illustrates a concrete example of a use for the portable telephone at authentication time. In FIG. 16, the case where the portable telephone 100 performs authentication by the vein pattern of the palm of the user's hand 31 for checking whether or not the user can use the portable telephone 100 is illustrated. In this case, for example, the user holds the portable telephone 100 in the other hand 32 and presses down the button 102 to begin authentication. The portable telephone 100 then irradiates the hand 31 with a distance measuring light beam 61 and measures the distance between the hand 31 and the image capture section 110.

If the portable telephone 100 determines that the distance between the hand 31 and the image capture section 110 is not proper for image capture, then the portable telephone 100 irradiates the hand 31 with a flashing guidance light beam 62. An indicator image projected by the guidance light beam 62 corresponds to the indicator image 52 of FIG. 12. On the basis of whether a cycle in which the guidance light beam 62 flashes is long or short, the user can determine whether to bring the portable telephone 100 close to or far from the hand 31.

If the portable telephone 100 determines that the distance between the hand 31 and the image capture section 110 is proper for image capture, then the portable telephone 100 captures an image of the vein pattern of the palm of the hand 31. The portable telephone 100 compares a vein pattern acquired by the image capture with the vein pattern of the user registered in advance, and calculates similarity parameter between these vein patterns. If the similarity parameter calculated is larger than or equal to P1 and is smaller than or equal to P2, then the portable telephone 100 determines that reauthentication is necessary. In addition to the guidance light beam 62, the portable telephone 100 then irradiates the hand 31 with a guidance light beam 63 for projecting additional indicator images on the basis of positioning information obtained as a result of positioning. The indicator images projected by the guidance light beam 63 correspond to the indicator images 53a, 53b, and 53c of FIG. 12.

The user can easily perform vein authentication in this way by holding the portable telephone 100 in one hand and capturing an image of the palm of the other hand. After pressing down the button 102 to give instructions to begin authentication, the user need not perform button operation. After that, the portable telephone 100 automatically captures an image of the vein pattern when the distance between the hand and the image capture section 110 becomes proper for image capture. Therefore, compared with the case where button operation is performed at image capture time, the influence of an unintentional movement of the hand is reduced.

Furthermore, the portable telephone 100 can guide the user by an indicator image projected on the hand 31. Accordingly, the user can perform vein authentication without performing operation for exposing the display 106 (for example, in a state in which the display 106 is folded). That is to say, compared with the case where such operation is performed in order to perform vein authentication, operationality can be improved.

The above authentication function can be applied not only to the portable telephone 100 but also to other portable terminal units.

Furthermore, in the above description the user is prompted to change the position of the image capture section 110 with respect to the palm. However, the user may be prompted to change the position of the palm with respect to the image capture section 110. In this case, guidance information is generated for guiding the palm in a direction reverse to the above direction in which the image capture section 110 is guided.

In addition, the functions which the portable telephone 100 should have can also be realized by making a computer execute a program in which the processing contents of the functions are described. The program in which the processing contents of the functions are described can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a DVD-RAM, a compact disk read only memory (CD-ROM), a CD-recordable (R)/rewritable (RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When the computer executes this program, it will store the program, which is recorded on a portable record medium or which is transferred from the server computer, in, for example, its storage unit. Then the computer reads the program from its storage unit and performs processes in compliance with the program. The computer can also read the program directly from a portable record medium and perform processes in compliance with the program. Furthermore, each time the program is transferred from the server computer, the computer can perform processes in turn in compliance with the program it receives.

The authentication apparatus, the image capture apparatus, the authentication method, and the authentication program according to the present invention have been described on the basis of the embodiments illustrated by the drawings. However, the authentication apparatus, the image capture apparatus, the authentication method, and the authentication program according to the present invention are not limited to these embodiments. The structure of each section can be replaced with any structure having the same function. In addition, any other section or process may be added. Furthermore, the structure (characteristics) of any two or more of the above embodiments may be combined.

According to the above authentication apparatus, image capture apparatus, authentication method, and authentication program, the reproducibility of the position of an object of authentication can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An authentication apparatus for performing biometrics authentication comprising:
    an operation section which calculates, at the time of acquiring a living body image which an image capture apparatus generates by capturing an image of a living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and
    an output section which outputs guidance information for prompting a reduction in the difference in the relative position calculated by the operation section, wherein:
    the output section outputs the guidance information in the case of similarity parameter between the living body image and the registered image being a value in a determined range, and
    the determined range of the similarity parameter is an area in which first similarity parameter distribution obtained in the case of the living body image matching the registered image and second similarity parameter distribution obtained in the case of the living body image not matching the registered image overlap.

2. The authentication apparatus according to claim 1, wherein the
    operation section rotates the living body image on an image plane and calculates, by dynamic programming matching, an angle of the rotation by which determined similarity parameter between the living body image after the rotation and the registered image is minimized as information regarding the difference in the relative position.

3. The authentication apparatus according to claim 1, wherein
    the operation section performs perspective transformation on the living body image so that the living body image is projected on a projective plane different from an image plane, and calculates, by dynamic programming matching, an angle between the image plane and the projective plane by which determined similarity parameter between the living body image after the perspective transformation and the registered image is minimized as information regarding the difference in the relative position.

4. The authentication apparatus according to claim 1, wherein:
    the image capture apparatus includes a guidance section for projecting an image of an arrow on the living body; and
    the output section outputs information for designating a direction of the arrow indicative of a direction of movement of the image capture apparatus or the living body to the guidance section as the guidance information.

5. An authentication apparatus for performing biometrics authentication comprising:
    an operation section which calculates, at the time of acquiring a living body image which an image capture apparatus generates by capturing an image of a living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and
    an output section which outputs guidance information for prompting a reduction in the difference in the relative position calculated by the operation section,
    wherein, when the image capture apparatus includes a guidance section for projecting both a first spot image and a second spot image on the living body at the same time, the output section outputs both information for designating a determined first position in a current image capture area of the image capture apparatus as a position at which the first spot image is projected and information for designating a second position corresponding to the first position in an image capture area of the image capture apparatus at the time of capturing the registered image as a position at which the second spot image is projected, to the guidance section as the guidance information.

6. The authentication apparatus according to claim 1 further comprising a voice output section which outputs voice for giving notice of the guidance information outputted by the output section.

7. The authentication apparatus according to claim 1 further comprising a display section which displays an image for giving notice of the guidance information outputted by the output section.

8. An authentication apparatus for performing biometrics authentication comprising:
    a measuring section which measures distance between the living body and the image capture apparatus;
    a flashing instruction section which designates a cycle in which a light beam with which a distance guidance section included in the image capture apparatus irradiates the living body flashes according to the distance measured by the measuring section;
    an operation section which calculates, at the time of acquiring a living body image which the image capture apparatus generates by capturing an image of the living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and an output section which outputs guidance information for prompting a reduction in the difference in the relative position calculated by the operation section.

9. The authentication apparatus according to claim 8 further comprising an image capture control section which makes the image capture apparatus capture an image of the living body at the time of the distance measured by the measuring section being a determined distance value.

10. An image capture apparatus for performing biometrics authentication comprising:
   an image capture section which captures an image of a living body and generates a living body image;
   an operation section which calculates, at the time of acquiring the living body image generated by the image capture section, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image;
   an output section which outputs guidance information for prompting a reduction in the difference in the relative position calculated by the operation section; and
   a guidance section which gives notice of the guidance information outputted by the output section, wherein:
   the output section outputs the guidance information in the case of similarity parameter between the living body image and the registered image being a value in a determined range, and
   the determined range of the similarity parameter is an area in which first similarity parameter distribution obtained in the case of the living body image matching the registered image and second similarity parameter distribution obtained in the case of the living body image not matching the registered image overlap.

11. An authentication method by an authentication apparatus for performing biometrics authentication, the method comprising:
   calculating, by an operation section at the time of the operation section acquiring a living body image which an image capture apparatus generates by capturing an image of a living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and
   outputting, by an output section, guidance information for prompting a reduction in the difference in the relative position calculated by the operation section in the case of similarity parameter between the living body image and the registered image being a value in a determined range, wherein
   the determined range of the similarity parameter is an area in which first similarity parameter distribution obtained in the case of the living body image matching the registered image and second similarity parameter distribution obtained in the case of the living body image not matching the registered image overlap.

12. A non-transitory computer-readable medium storing an authentication program for making a computer perform biometrics authentication, the program making the computer function as:
   an operation section which calculates, at the time of acquiring a living body image which an image capture apparatus generates by capturing an image of a living body, a difference, on the basis of the living body image and a registered image stored in a registered image storage section, between a relative position of the living body with respect to the image capture apparatus at the time of the image capture apparatus capturing the image of the living body for generating the living body image and a relative position of the living body with respect to the image capture apparatus at the time of the image capture apparatus capturing an image of the living body for generating the registered image; and
   an output section which outputs guidance information for prompting a reduction in the difference in the relative position calculated by the operation section, wherein:
   the output section outputs the guidance information in the case of similarity parameter between the living body image and the registered image being a value in a determined range, and
   the determined range of the similarity parameter is an area in which first similarity parameter distribution obtained in the case of the living body image matching the registered image and second similarity parameter distribution obtained in the case of the living body image not matching the registered image overlap.

13. The authentication apparatus according to claim 1, wherein the operation section translates the living body image on an image plane and calculates, by dynamic programming matching, a direction and distance of the translation by which determined similarity parameter between the living body image after the translation and the registered image is minimized as information regarding the difference in the relative position.

\* \* \* \* \*